(12) United States Patent
Ezumi

(10) Patent No.: US 6,532,371 B2
(45) Date of Patent: *Mar. 11, 2003

(54) COMMUNICATION DEVICE HAVING RADIO UNIT FOR PERFORMING RADIO COMMUNICATION

(75) Inventor: Yosuke Ezumi, Takasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,109

(22) Filed: Oct. 15, 1997

(65) Prior Publication Data

US 2002/0068606 A1 Jun. 6, 2002

(30) Foreign Application Priority Data

Oct. 16, 1996 (JP) .............................. 8-273526

(51) Int. Cl.$^7$ ................................. H04B 1/38
(52) U.S. Cl. ....................... 455/557; 455/575
(58) Field of Search ................. 455/422, 556, 455/557, 558, 575, 466, 90; 358/400, 468; 375/222; 379/55

(56) References Cited

U.S. PATENT DOCUMENTS

| | | | | |
|---|---|---|---|---|
| 5,373,300 A | * | 12/1994 | Jenness | 455/575 |
| 5,628,055 A | * | 5/1997 | Stein | 455/90 |
| 5,815,288 A | | 9/1998 | Ezumi et al. | 358/468 |
| 5,822,692 A | * | 10/1998 | Krishan et al. | 455/557 |
| 5,884,190 A | * | 3/1999 | Lintula et al. | 455/557 |
| 5,966,669 A | | 10/1999 | Kenmochi et al. | 455/557 |

FOREIGN PATENT DOCUMENTS

| | | |
|---|---|---|
| JP | 4083454 | 3/1992 |
| JP | 4249466 | 9/1992 |
| JP | 7064887 | 3/1995 |

* cited by examiner

Primary Examiner—Thanh Cong Le
(74) Attorney, Agent, or Firm—Fitzpatrick, Cella, Harper & Scinto

(57) ABSTRACT

When a radio unit incorporated in a facsimile device is made replaceable to make various radio units usable, a change in specification of communication between a facsimile body and a radio unit is made unnecessary. For this purpose, according to the present invention, a radio unit, which is united, for performing radio communication with another communication device, a controller for controlling the communication device, and an interface for performing communication of various control signals between the radio unit and the controller are arranged, the radio unit is replaced with another type of radio unit, and the interface and the control signal transmitting/receiving through the interface are shared regardless of the type of radio unit.

11 Claims, 43 Drawing Sheets

FIG. 2

<FAX CPU→CT CPU>

| | |
|---|---|
| OUTSIDE LINE INCOMING START | IT IS NOTIFIED WHEN FAX CPU DETECTS OUTSIDE LINE INCOMING SIGNAL. CT CPU STARTS LINE OUTSIDE INCOMING CONNECTION BY NOTIFICATION. |
| THE PRESENCE OF OUTSIDE LINE INCOMING (THE PRESENCE OF BELL) | IT IS NOTIFIED WHEN THE PRESENCE OF INCOMING SIGNAL → THE ABSENCE OF INCOMING SIGNAL. EXTENSION TELEPHONE MAKES SOUND ACCORDING TO CODE. |
| THE ABSENCE OF OUTSIDE LINE INCOMING (THE ABSENCE OF BELL) | WHEN THE PRESENCE OF OUTSIDE LINE INCOMING IS NOT TRANSFERRED FOR 4 SECONDS OR LONGER IN CT CPU, OUTSIDE LINE INCOMING CONNECTION IS AUTOMATICALLY ENDED. |
| OUTSIDE LINE INCOMING END | IT IS NOTIFIED WHEN END CONFIRMATION OF OUTSIDE LINE INCOMING SIGNAL CAN BE OBTAINED. CT CPU ENDS OUTSIDE LINE INCOMING CONNECTION. |
| WIRED OFF-HOOK | IT IS NOTIFIED WHEN HANDSET (WIRED) OF FACSIMILE DEVICE IS IN OFF-HOOK STATE. |
| WIRED ON-HOOK | IT IS NOTIFIED WHEN HANDSET (WIRED) OF FACSIMILE DEVICE IS IN ON-HOOK STATE. CT CPU NOTIFIES EXTENSION TELEPHONE OF SHIFT TO WAIT STATE BY END OF SPEECH COMMUNICATION IN EXTENSION LINE SPEECH COMMUNICATION. |
| EXTENSION CALLING | IT IS NOTIFIED WHEN EXTENSION CALL FROM FACSIMILE DEVICE TO EXTENSION TELEPHONE IS PERFORMED, AND CT CPU STARTS CALLING CONNECTION OF FACSIMILE DEVICE → EXTENSION TELEPHONE FOR EXTENSION TELEPHONE. |
| EXTENSION RESPONSE | IT IS NOTIFIED WHEN FACSIMILE DEVICE RESPONDS IN EXTENSION CALLING STATE FROM EXTENSION TELEPHONE TO FACSIMILE DEVICE. CT CPU PERFORMS EXTENSION LINE SPEECH COMMUNICATION FOR EXTENSION TELEPHONE. |
| EXTENSION CALLING INTERRUPTION | IT IS NOTIFIED WHEN CALLING FROM FACSIMILE DEVICE IS STOPPED WHEN EXTENSION CALLING IS PERFORMED FROM FACSIMILE DEVICE. CT CPU STOPS RINGING TONE FOR EXTENSION TELEPHONE TO NOTIFY SHIFT TO WAIT STATE. |
| SPEECH COMMUNICATION TRANSFER START | IT IS NOTIFIED WHEN [TRANSFER] OF FACSIMILE DEVICE IS PRESSED IN SPEECH COMMUNICATION. CT CPU REQUESTS EXTENSION TELEPHONE TO START TRANSFER SEQUENCE. |
| SPEECH COMMUNICATION TRANSFER INTERRUPTION | IT IS NOTIFIED WHEN CALLING IS STOPPED FROM FACSIMILE DEVICE WHEN SPEECH COMMUNICATION TRANSFER AND CALLING OF THREE-PERSON SPEECH COMMUNICATION ARE PERFORMED FROM FACSIMILE DEVICE. CT CPU STOP MAKING OF RINGING TONE FOR EXTENSION TELEPHONE TO NOTIFY SHIFT TO WAIT STATE. |
| THREE-PERSON SPEECH COMMUNICATION COMPLETION | ESTABLISHMENT OF THREE-PERSON SPEECH COMMUNICATION PROTOCOL IS NOTIFIED FROM FACSIMILE DEVICE. CT CPU NOTIFIES IT TO EXTENSION TELEPHONE TO TURN ON OUTSIDE LINE DISPLAY. |
| REMOTE END | AUTOMATIC RECORDING MODE, FAX RECEPTION SWITCHING, AND COMPLETION OF AUTOMATIC RECORDING/CANCELING ARE NOTIFIED FROM FACSIMILE DEVICE. CT CPU SHIFTS TO WAIT STATE. |
| EXTENSION SIMULTANEOUS CALLING | IT IS NOTIFIED WHEN ALL CONNECTED EXTENSION TELEPHONES IN EXTENSION CALLING FROM FACSIMILE DEVICE TO EXTENSION TELEPHONE ARE CALLED. |

FIG. 3

| TRANSFER SIMULTABEOUS CALLING | IT IS NOTIFIED WHEN ALL CONNECTED EXTENSION TELEPHONES IN TRANSFER CALLING FROM FACSIMILE DEVICE TO EXTENSION TELEPHONE. |
|---|---|
| REQUEST REJECTION | CT CPU REQUEST COMMAND IS REJECTED BECAUSE FAX IS BEING PREFERENTIALLY OPERATED. CT CPU MAKES ERROR TONE FOR EXTENSION TELEPHONE TO NOTIFY SHIFT TO WAIT STATE. |
| EXTENSION TELEPHONE ADDITION MODE | SHIFT TO EXTENSION TELEPHONE ADDITION MODE IS NOTIFIED. EXTENSION TELEPHONE ADDITION MODE IS EFFECTIVE ONLY 5 SECONDS AFTER CT CPU IS RESET. |
| ADDITION MODE CANCELLATION | FAX CPU IT TO CT CPU WHEN EXTENSION TELEPHONE ADDITION MODE IS CANCELED TO RETURN TO NORMAL SEQUENCE. |
| ADDITION RESET | NOTIFICATION IT WHEN ADDED EXTENSION TELEPHONE IS RESET IN ADDITION MODE. |
| BELL ON EXTENSION TELEPHONE | FAX CPU NOTIFIES IT TO CT CPU WHEN ONLY ONE EXTENSION TELEPHONE WHICH RINGS BELL IN OUTSIDE LINE INCOMING IS DESIGNATED. |
| EXTENSION TELEPHONE FORCIBLE STAND-BY | IT IS NOTIFIED WHEN FAX CPU FORCIBLY CHANGES STATE OF EXTENSION TELEPHONE INTO WAIT STATE. CT CPU RECEIVES NOTIFICATION OF EXTENSION FORCIBLE STAND-BY COMMAND TO CAUSE EXTENSION TELEPHONE TO RETURN TO WAIT STATE. |
| PB OUTSIDE LINE SPEECH COMMUNICATION STATE CONFIRMATION | FAX CPU IT IS NOTIFIED TO CONFIRM STATE OF RADIO UNIT AT PREDETERMINED INTERVALS WHEN STATE OF EXTENSION OUTSIDE LINE SPEECH COMMUNICATION (DOES NOT INCLUDE EXTENSION TELEPHONE OUTSIDE LINE HOLDING) DOES NOT CHANGE. CT CPU NOTIFIES ACK TO FAX CPU IF STATE DOES NOT CHANGE; OTHERWISE, NO RESPONSE IS SENT BACK. |
| PB THREE-PERSON SPEECH COMMUNICATION STATE CONFIRMATION | FAX CPU NOTIFIES IT TO CONFIRM STATE OF RADIO UNIT AT PREDETERMINED INTERVALS WHEN THREE-PERSON SPEECH COMMUNICATION STATE OF EXTENSION TELEPHONE DOES NOT CHANGE. CT CPU NOTIFIES ACK TO FAX CPU IF STATE DOES NOT CHANGE; OTHERWISE NO RESPONSE IS SENT BACK. |
| PB TRANSFER EXTENSION LINE SPEECH COMMUNICATION STATE CONFIRMATION | FAX CPU NOTIFIES IT TO CONFIRM STATE OF RADIO UNIT AT PREDETERMINED INTERVALS WHEN PARENT-EXTENSION TRANSFER EXTENSION LINE SPEECH COMMUNICATION STATE DOES NOT CHANGE. CT CPU NOTIFIES ACK TO FAX CPU IF STATE DOES NOT CHANGE; OTHERWISE NO RESPONSE IS SENT BACK. |
| PB WAIT STATE CONFIRMATION | FAX CPU NOTIFIES IT TO CONFIRM STATE OF RADIO UNIT IN WAIT STATE. CT CPU NOTIFIES ACK TO FAX CPU IF STATE DOES NOT CHANGE; OTHERWISE NO RESPONSE IS SENT BACK. |
| OUT-OF-RANGE PRIMARY DETECTION | IT IS NOTIFIED BY OUT-OF-RANGE DETECTION FOR 1 SECOND IN SPEECH COMMUNICATION. |
| OUT-OF-RANGE DETECTION CANCELLATION | IT IS NOTIFIED WHEN OUT-OF-RANGE DETECTION IS CANCELED. |

FIG. 4

| FIG. 4A |
|---|
| FIG. 4B |

FIG. 4A

<CT CPU→FAX CPU>

| | |
|---|---|
| OUTSIDE LINE SPEECH COMMUNICATION | IT IS NOTIFIED SPEECH COMMUNICATION CONNECTION IS SUCCEEDED AFTER [OUTSIDE LINE] OF EXTENSION TELEPHONE IS PRESSED. FAX CPU ASSURES (OFF-HOOK) LINE TO OOPEN AUDIO PATH. |
| DIAL CODE | TYPE OF DIAL CODE IS NOTIFIED WHEN DIAL KEY OF EXTENSION TELEPHONE IS PRESSED IN EXTENSION TELEPHONE OUTSIDE LINE SPEECH COMMUNICATION STATE OR EXTENSION TELEPHONE REMOTE STATE. FAX CPU EXECUTES DIAL OUTPUT OR FEATURE ACCORDING TO TPE OF KEY. |
| OUTSIDE LINE CUTTING | IT IS NOTIFIED WHEN [CUT] IS PRESSED IN EXTENSION TELEPHONE SPEECH COMMUNICATION STATE. FAX CPU CUTS (ON-HOOK) LINE TO CLOSE AUDIO PATH. |
| HOLD SETTING | IT IS NOTIFIED WHEN [HOLD] IS PRESSED IN SPEECH COMMUNICATION. FAX CPU SETS LINE IN HOLDING STATE TO PLAY MELODY. |
| HOLD CANCELLATION | IT IS NOTIFIED WHEN [HOLD] IS PRESSED AGAIN IN HOLDING STATE. HOLDING STATE IS CANCELED TO RETURN TO SPEECH COMMUNICATION. |
| EXTENSION CALLING | IT IS NOTIFIED WHEN EXTENSION LINE CALLING IS PERFORMED FROM EXTENSION TELEPHONE. FAX CPU MAKES RINGING TONE. |
| EXTENSION RESPONSE | IT IS NOTIFIED WHEN EXTENSION TELEPHONE RESPONDS IN EXTENSION LINE CALLING STATE OF FACSIMILE DEVICE → ECTENSION TELEPHONE. FAX CPU OPENS AUDIO PATH FOR EXTENSION LINE SPEECH COMMUNICATION. |
| RESPONSE INTERRUPTION | IT IS NOTIFIED TO FAX CPU WHEN THERE IS CANCEL NOTIFICATION OF CALLING IN EXTENSION LINE CALLING FROM EXTENSION TELEPHONE. |
| RING BACK TONE OK | IT IS NOTIFIED TO FAX CPU WHEN CONNECTION TO EXTENSION TELEPHONE IN EXTENSION LINE CALLING STATE OF FACSIMILE DEVICE → EXTENSION TELEPHONE. |
| CATCH | IT IS NOTIFIED WHEN EXTENSION TELEPHONE [CATCH] IS PRESSED IN SPEECH COMMUNICATION. FAX CPU RELEASES LINE FOR 400 ms - 600 ms (FLASH OPERATION) |
| SPEECH COMMUNICATION TRANSFER START | IT IS NOTIFIED WHEN FACSIMILE DEVICE IS REQUESTED TO PERFORM SPEECH COMMUNICATION TRANSFER FROM EXTENSION TELEPHONE IN SPEECH COMMUNICATION. FAX CPU HOLDS LINE TO START TRANSFER FEATURE. |
| SPEECH COMMUNICATION TRANSFER INTERRUPTION | IT IS NOTIFIED WHEN CALLING IS INTERRUPTED FROM EXTENSION TELEPHONE WHEN CALLING OF SPEECH COMMUNICATION TRANSFER AND THREE-PERSON SPEECH COMMUNICATION TRANSFER IS PERFORMED FROM EXTENSION TELEPHONE. CT CPU STOPS MAKING OF RINGING TONE TO SHIFT TO OUTSIDE LINE CONNECTION. |

FIG. 4B

| IN CALLING OF INTER-EXTENSION-TELEPHONE TRANSFER | FAX CPU IS REQUESTED TO PERFORM HOLD RINGING TONE CONTROL IN INTER-EXTENSION-TELEPHONE SPEECH COMMUNICATION TRANSFER. |
|---|---|
| CANCELLATION OF INTER-EXTENSION-TELEPHONE TRANSFER | FAX CPU IS REQUESTED TO PERFORM INTERRUPTION OF INTER-EXTENSION-TELEPHONE TRANSFER AND PATH CONTROL. |
| THREE-PERSON SPEECH COMMUNICATION COMPLETION | ESTABLISHMENT OF THREE-PERSON SPEECH COMMUNICATION PROTOCOL IS NOTIFIED FROM EXTENSION TELEPHONE. FAX CPU PERFORMS AUDIO PATH CONTROL FOR THREE-PERSON SPEECH COMMUNICATION. |
| REQUEST REJECTION | IT IS NOTIFIED TO FAX CPU WHEN COMMAND REQUEST FROM FAX CPU CANNOT BE EXECUTED BY TURNING OFF EXTENSION TELEPHONE. |
| FAX RECEPTION SWITCHING | CT CPU NOTIFIES FAX RECEPTION SWITCHING REQUEST TO FAX CPU WHEN REMOTE RECEPTION BUTTON IS PRESSED IN EXTENSION TELEPHONE. |

FIG. 5

| EXTENSION TELEPHONE REMOTE | IT IS NOTIFIED WHEN REMOTE CONNECTION IS SUCCEEDED AFTER EXTENSION TELEPHONE [REMOTE] IS PRESSED. FAX CPU SUBSEQUENTLY EXECUTES AUTOMATIC RECORDING TELEPHONE FEATURE AS EXTENSION REMOTE MODE STATE ACCORDING TO FOLLOWING DIAL CODE. |
|---|---|
| EXTENSION TELEPHONE REMOTE CANCELLATION | WHEN EXTENSION TELEPHONE [REMOTE] IS PRESSED IN EXTENSION TELEPHONE REMOTE OPERATION IN STATE TRANSITION FROM WAIT STATE, REMOTE OPERATION IS CANCELED TO SET EXTENSION TELEPHONE IN WAIT STATE. REQUEST OF REMOTE CANCELLATION IS NOTIFIED TO FAX CPU. STATE RETURNS TO SPEECH COMMUNICATION STATE IN STATE TRANSITION FROM SPEECH COMMUNICATION STATE. |
| PRIMARY OUT-OF-RANGE DETECTION | IT IS NOTIFIED WHEN FACSIMILE DEVICE RECOGNIZES THAT EXTENSION TELEPHONE IS SET OUT OF RANGE IN SPEECH COMMUNICATION (ONE SECOND) TO MUTE LOUDSPEAKER. |
| OUT-OF-RANGE DETECTION CANCELLATION | IT IS NOTIFIED TO FAX CPU WHEN FACSIMILE DEVICE RECOGNIZES EXTENSION TELEPHONE IN PRIMARY OUT-OF-RANGE DETECTION STATE. |
| OUT OF SPEECH COMMUNICATION RANGE | IT IS NOTIFIED WHEN FAXSIMILE DEVICE RECOGNIZES THAT EXTENSION TELEPHONE IS SET OUT OF SPEECH COMMUNICATION RANGE IN SPEECH COMMUNICATION TO TRANSIT STATE TO WAIT STATE. (PRIMARY OUT-OF-RANGE DETECTION STATE CONTINUES FOR 20 SECONDS) |
| RADIO CONNECTION FAULT | IT IS NOTIFIED WHEN RESPONSE CANNOT BE OBTAINED IN EXTENSION TELEPHONE CONNECTION TO TRANSIT STATE TO WAIT STATE. |
| RADIO CONNECTION SUCCESS | IT IS NOTIFIED TO FAX CPU WHEN SHIFT FROM C-CH (CONTROL CHANNEL) TO V-CH (COMMUNICATION CHANNEL) IS SUCCEEDED IN EXTENSION TELEPHONE CONNECTION. |
| NUMBER OF ADDITIONAL EXTENSION TELEPHONES | NUMBER OF ADDITIONAL EXTENSION TELEPHONES IS NOTIFIED TO FAX CPU WHEN CT CPU SUCCEEDS EXTENSION TELEPHONE ADDITION IN EXTENSION TELEPHONE ADDITION MODE TO RECOGNIZE THE NUMBER OF EXTENSION TELEPHONES. |
| RESET ON | CT CPU NOTIFIES INITIAL COMMAND TO FAX CPU WHEN MICROCOMPUTER IS RESET. |

FIG. 6A

COMMAND BIT PATTERN (FAX CPU => CT CPU)

| COMMAND | Bit5 | Bit4 | Bit3 | Bit2 | Bit1 | Bit0 |
|---|---|---|---|---|---|---|
| UNUSED | 0 | 0 | 0 | 0 | 0 | 0 |
| THE PRESENCE OF OUTSIDE LINE INCOMING | 0 | 0 | 0 | 0 | 0 | 1 |
| THE ABSENCE OF OUTSIDE LINE INCOMING | 0 | 0 | 0 | 0 | 1 | 0 |
| OFF-HOOK | 0 | 0 | 0 | 0 | 1 | 1 |
| ON-HOOK | 0 | 0 | 0 | 1 | 0 | 0 |
|  | 0 | 0 | 0 | 1 | 0 | 1 |
| EXTENSION LINE RESPONSE | 0 | 0 | 0 | 1 | 1 | 0 |
| EXTENSION LINE INTERRUPTION | 0 | 0 | 0 | 1 | 1 | 1 |
| TRANSFER SIMULTANEOUS CALLING | 0 | 0 | 1 | 0 | 0 | 0 |
| SPEECH COMMUNICATION TRANSFER INTERRUPTION | 0 | 0 | 1 | 0 | 0 | 1 |
| THREE-PERSON SPEECH COMMUNICATION COMPLETION | 0 | 0 | 1 | 0 | 1 | 0 |
|  | 0 | 0 | 1 | 0 | 1 | 1 |
| REMOTE END | 0 | 0 | 1 | 1 | 0 | 0 |
| REQUEST REJECTION | 0 | 0 | 1 | 1 | 0 | 1 |
| EXTENSION TELEPHONE ADDITION MODE | 0 | 0 | 1 | 1 | 1 | 0 |
| ADDITION MODE CANCELLATION | 0 | 0 | 1 | 1 | 1 | 1 |
| OUTSIDE LINE INCOMING START | 0 | 1 | 0 | 0 | 0 | 0 |
| OUTSIDE LINE INCOMING END | 0 | 1 | 0 | 0 | 0 | 1 |
| ADDITION RESET | 0 | 1 | 0 | 0 | 1 | 0 |
| EXTENSION SIMULTANEOUS CALLING | 0 | 1 | 0 | 0 | 1 | 1 |
| EXTENSION LINE CALLING 1 | 0 | 1 | 0 | 1 | 0 | 0 |
| EXTENSION LINE CALLING 2 | 0 | 1 | 0 | 1 | 0 | 1 |
| EXTENSION LINE CALLING 3 | 0 | 1 | 0 | 1 | 1 | 0 |
| EXTENSION LINE CALLING 4 | 0 | 1 | 0 | 1 | 1 | 1 |
| SPEECH COMMUNICATION TRANSFER 1 | 0 | 1 | 1 | 0 | 0 | 0 |
| SPEECH COMMUNICATION TRANSFER 2 | 0 | 1 | 1 | 0 | 0 | 1 |
| SPEECH COMMUNICATION TRANSFER 3 | 0 | 1 | 1 | 0 | 1 | 0 |
| SPEECH COMMUNICATION TRANSFER 4 | 0 | 1 | 1 | 0 | 1 | 1 |
| BELL ON 1 | 0 | 1 | 1 | 1 | 0 | 0 |
| BELL ON 2 | 0 | 1 | 1 | 1 | 0 | 1 |
| BELL ON 3 | 0 | 1 | 1 | 1 | 1 | 0 |
| BELL ON 4 | 0 | 1 | 1 | 1 | 1 | 1 |

FIG. 6B

COMMAND BIT PATTERN (FAX CPU => CT CPU)

| COMMAND | Bit5 | Bit4 | Bit3 | Bit2 | Bit1 | Bit0 |
|---|---|---|---|---|---|---|
| PB FORCIBLE STAND-BY | 1 | 0 | 0 | 0 | 0 | 0 |
| DIAL 1 | 1 | 0 | 0 | 0 | 0 | 1 |
| DIAL 2 | 1 | 0 | 0 | 0 | 1 | 0 |
| DIAL 3 | 1 | 0 | 0 | 0 | 1 | 1 |
| DIAL 4 | 1 | 0 | 0 | 1 | 0 | 0 |
| DIAL 5 | 1 | 0 | 0 | 1 | 0 | 1 |
| DIAL 6 | 1 | 0 | 0 | 1 | 1 | 0 |
| DIAL 7 | 1 | 0 | 0 | 1 | 1 | 1 |
| DIAL 8 | 1 | 0 | 1 | 0 | 0 | 0 |
| DIAL 9 | 1 | 0 | 1 | 0 | 0 | 1 |
| DIAL 0 | 1 | 0 | 1 | 0 | 1 | 0 |
| PB OUTSIDE LINE CONFIRMATION | 1 | 0 | 1 | 0 | 1 | 1 |
| PB THREE-PERSON SPEECH COMMUNICATION CONFIRMATION | 1 | 0 | 1 | 1 | 0 | 0 |
| TRANSFER SPEECH COMMUNICATION CONFIRMATION | 1 | 0 | 1 | 1 | 0 | 1 |
|  |  |  |  |  |  |  |
|  |  |  |  |  |  |  |
| WAIT STATE CONFIRMATION | 1 | 1 | 0 | 0 | 0 | 0 |
|  | 1 | 1 | 0 | 0 | 0 | 1 |
|  | 1 | 1 | 0 | 0 | 1 | 0 |
|  | 1 | 1 | 0 | 0 | 1 | 1 |
|  | 1 | 1 | 0 | 1 | 0 | 0 |
|  | 1 | 1 | 0 | 1 | 0 | 1 |
|  | 1 | 1 | 0 | 1 | 1 | 0 |
|  | 1 | 1 | 0 | 1 | 1 | 1 |
|  | 1 | 1 | 1 | 0 | 0 | 0 |
|  | 1 | 1 | 1 | 0 | 0 | 1 |
|  | 1 | 1 | 1 | 0 | 1 | 0 |
|  | 1 | 1 | 1 | 0 | 1 | 1 |
|  | 1 | 1 | 1 | 1 | 0 | 0 |
| ACK OK | 1 | 1 | 1 | 1 | 0 | 1 |
| ACK NG | 1 | 1 | 1 | 1 | 1 | 0 |
| UNUSED | 1 | 1 | 1 | 1 | 1 | 1 |

FIG. 7A

COMMAND BIT PATTERN (CT CPU => FAX CPU)

| COMMAND | Bit5 | Bit4 | Bit3 | Bit2 | Bit1 | Bit0 |
|---|---|---|---|---|---|---|
| UNUSED | 0 | 0 | 0 | 0 | 0 | 0 |
| DIAL 1 | 0 | 0 | 0 | 0 | 0 | 1 |
| DIAL 2 | 0 | 0 | 0 | 0 | 1 | 0 |
| DIAL 3 | 0 | 0 | 0 | 0 | 1 | 1 |
| DIAL 4 | 0 | 0 | 0 | 1 | 0 | 0 |
| DIAL 5 | 0 | 0 | 0 | 1 | 0 | 1 |
| DIAL 6 | 0 | 0 | 0 | 1 | 1 | 0 |
| DIAL 7 | 0 | 0 | 0 | 1 | 1 | 1 |
| DIAL 8 | 0 | 0 | 1 | 0 | 0 | 0 |
| DIAL 9 | 0 | 0 | 1 | 0 | 0 | 1 |
| DIAL 0 | 0 | 0 | 1 | 0 | 1 | 0 |
| DIAL * | 0 | 0 | 1 | 0 | 1 | 1 |
| DIAL # | 0 | 0 | 1 | 1 | 0 | 0 |
|  | 0 | 0 | 1 | 1 | 0 | 1 |
| POSE | 0 | 0 | 1 | 1 | 1 | 0 |
| REQUEST REJECTION | 0 | 0 | 1 | 1 | 1 | 1 |
| OUTSIDE LINE SPEECH COMMUNICATION | 0 | 1 | 0 | 0 | 0 | 0 |
| OUTSIDE LINE CUTTING | 0 | 1 | 0 | 0 | 0 | 1 |
| HOLD SETTING | 0 | 1 | 0 | 0 | 1 | 0 |
| HOKD CANCELLATION | 0 | 1 | 0 | 0 | 1 | 1 |
| EXTENSION LINE CALLING | 0 | 1 | 0 | 1 | 0 | 0 |
| EXTENSION LINE RESPONSE | 0 | 1 | 0 | 1 | 0 | 1 |
| EXTENSION LINE INTERRUPTION | 0 | 1 | 0 | 1 | 1 | 0 |
| CATCH | 0 | 1 | 0 | 1 | 1 | 1 |
| SPEECH COMMUNICATION TRANSFER | 0 | 1 | 1 | 0 | 0 | 0 |
|  | 0 | 1 | 1 | 0 | 0 | 1 |
| SPEECH COMMUNICATION TRANSFER INTERRUPTION | 0 | 1 | 1 | 0 | 1 | 0 |
| IN CALLING OF INTER-EXTENSION-TELEPHONE | 0 | 1 | 1 | 0 | 1 | 1 |
| CANCELLATION OF INTER-EXTENSION-TELEPHONE CALLING | 0 | 1 | 1 | 1 | 0 | 0 |
| THREE-PERSON SPEECH COMMUNICATION COMPLETION | 0 | 1 | 1 | 1 | 0 | 1 |
| REMOTE | 0 | 1 | 1 | 1 | 1 | 0 |
| RING BACK ACK | 0 | 1 | 1 | 1 | 1 | 1 |

FIG. 7B

COMMAND BIT PATTERN (CT CPU =>FAX CPU)

| COMMAND | Bit5 | Bit4 | Bit3 | Bit2 | Bit1 | Bit0 |
|---|---|---|---|---|---|---|
| REMOTE CANCELLATION | 1 | 0 | 0 | 0 | 0 | 0 |
| OUT-OF-SPEECH-COMMUNICATION-RANGE DETECTION | 1 | 0 | 0 | 0 | 0 | 1 |
| RADIO CONNECTION FAULT | 1 | 0 | 0 | 0 | 1 | 0 |
| RADIO CONNECTION SUCCESS | 1 | 0 | 0 | 0 | 1 | 1 |
| NUMBER OF ADDED EXTENSION TELEPHONE 1 | 1 | 0 | 0 | 1 | 0 | 0 |
| NUMBER OF ADDED EXTENSION TELEPHONE 2 | 1 | 0 | 0 | 1 | 0 | 1 |
| NUMBER OF ADDED EXTENSION TELEPHONE 3 | 1 | 0 | 0 | 1 | 1 | 0 |
| NUMBER OF ADDED EXTENSION TELEPHONE 4 | 1 | 0 | 0 | 1 | 1 | 1 |
| FAX SWITCHING | 1 | 0 | 1 | 0 | 0 | 0 |
| RST ON | 1 | 0 | 1 | 0 | 0 | 1 |
|  | 1 | 0 | 1 | 0 | 1 | 0 |
|  | 1 | 0 | 1 | 0 | 1 | 1 |
|  | 1 | 0 | 1 | 1 | 0 | 0 |
|  | 1 | 0 | 1 | 1 | 0 | 1 |
|  | 1 | 0 | 1 | 1 | 1 | 0 |
|  | 1 | 0 | 1 | 1 | 1 | 1 |
|  | 1 | 1 | 0 | 0 | 0 | 0 |
| PRIMARY OUT-OF-RANGE DETECTION | 1 | 1 | 0 | 0 | 0 | 1 |
| OUT-OF-RANGE DETECTION CANCELLATION | 1 | 1 | 0 | 0 | 1 | 0 |
|  | 1 | 1 | 0 | 0 | 1 | 1 |
|  | 1 | 1 | 0 | 1 | 0 | 0 |
|  | 1 | 1 | 0 | 1 | 0 | 1 |
|  | 1 | 1 | 0 | 1 | 1 | 0 |
|  | 1 | 1 | 0 | 1 | 1 | 1 |
|  | 1 | 1 | 1 | 0 | 0 | 0 |
|  | 1 | 1 | 1 | 0 | 0 | 1 |
|  | 1 | 1 | 1 | 0 | 1 | 0 |
|  | 1 | 1 | 1 | 0 | 1 | 1 |
|  | 1 | 1 | 1 | 1 | 0 | 0 |
| ACK OK | 1 | 1 | 1 | 1 | 0 | 1 |
| ACK NG | 1 | 1 | 1 | 1 | 1 | 0 |
| UNUSED | 1 | 1 | 1 | 1 | 1 | 1 |

STOP OF EXTENSION LINE SPEECH COMMUNICATION
(EXTENSION TELEPHONE → FACSIMILE DEVICE)

THREE-PERSON SPEECH COMMUNICATION
(FACSIMILE DEVICE → EXTENSION TELEPHONE)

AUTOMATIC RECORDING IS SET/CANCELED BY EXTENSION TELEPHONE REMOTE

CASE IS REPRODUCED BY EXTENSION TELEPHONE REMOTE EXCHANGE

CASE REPRODUCED BY EXTENSION TELEPHONE REMOTE (PART 2)

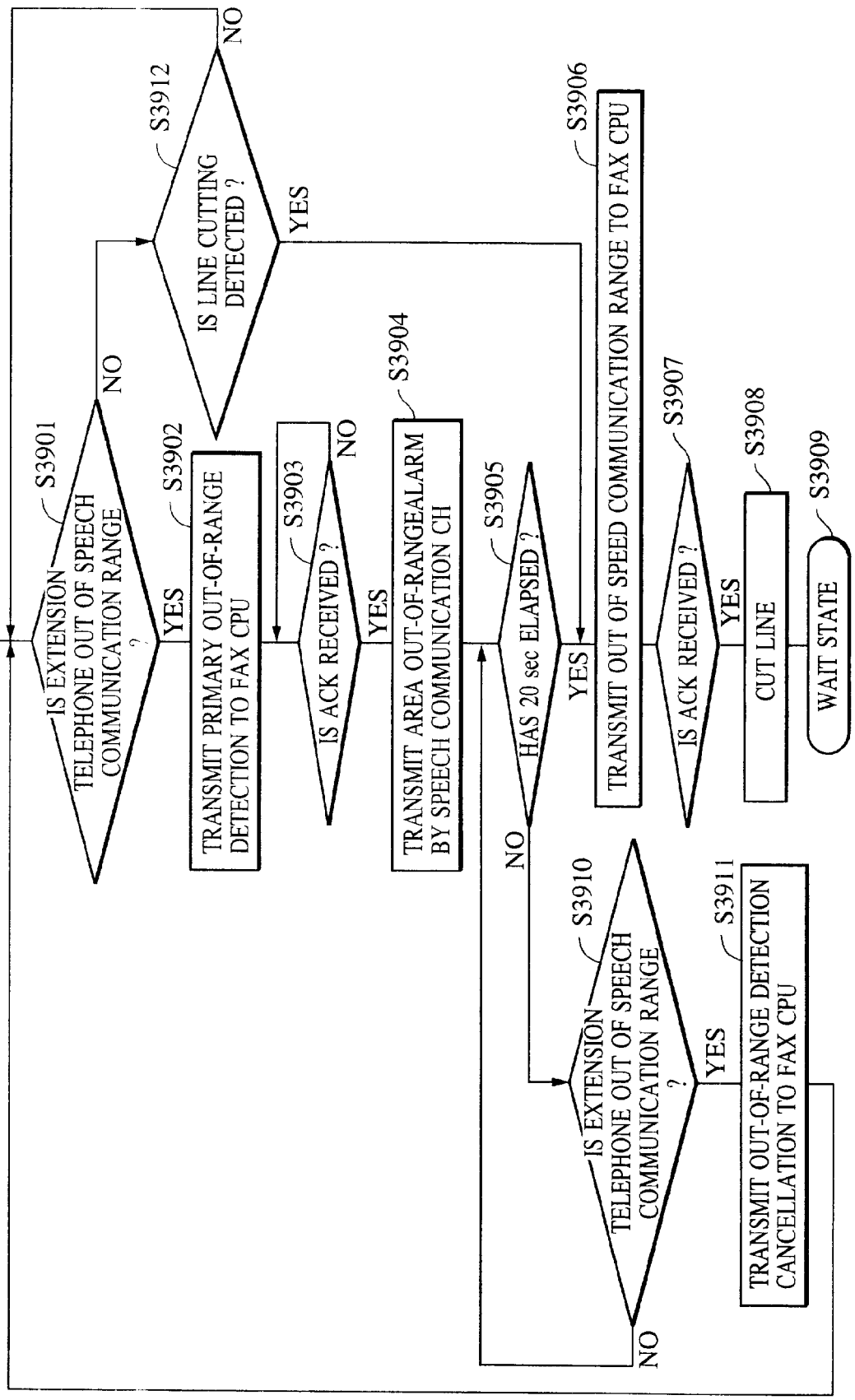

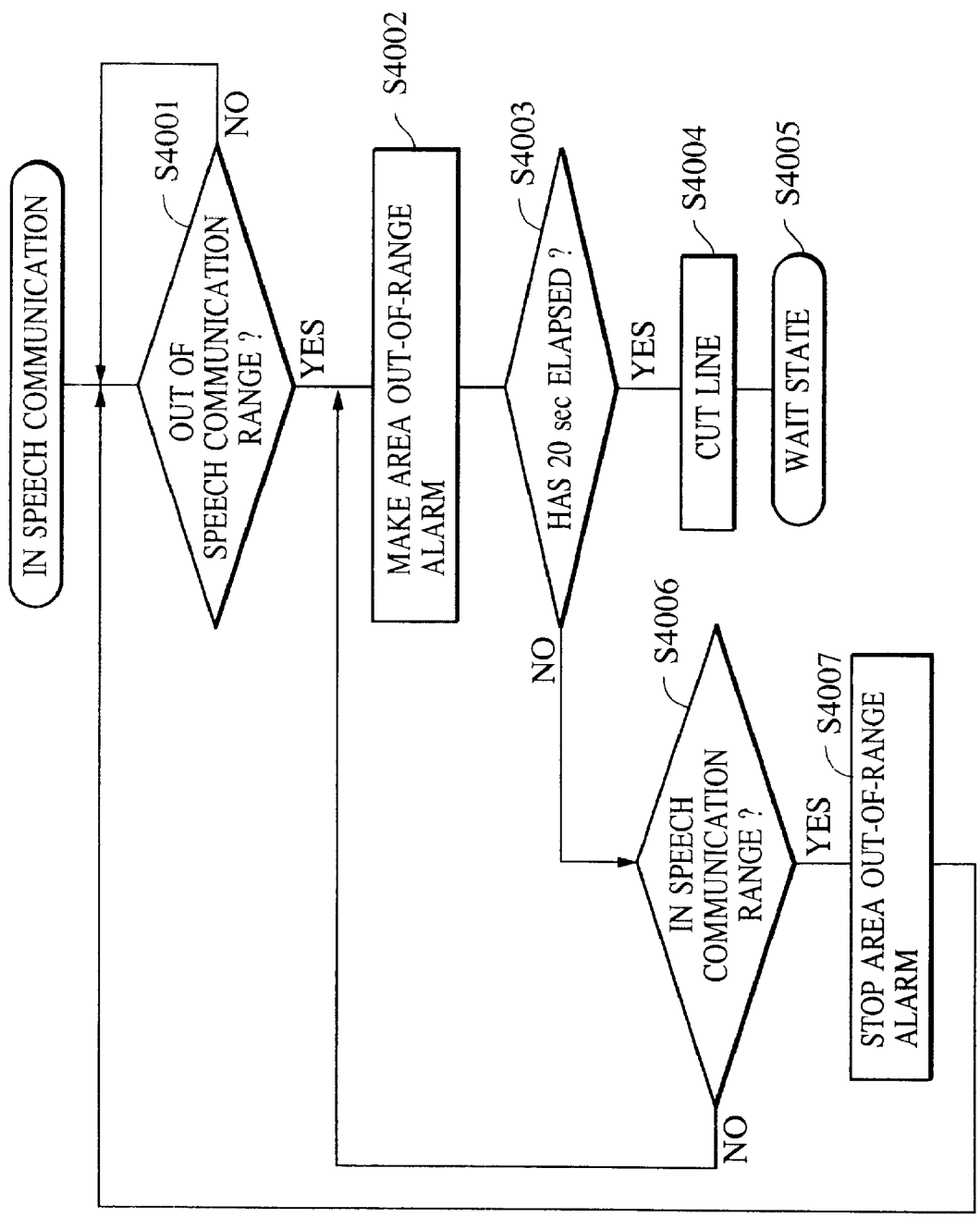

COMMUNICATION DEVICE HAVING RADIO UNIT FOR PERFORMING RADIO COMMUNICATION

BACKGROUND OF THE INVENTION

1. Field of the Invention

The present invention relates to a communication device having a radio unit for performing radio communication.

2. Description of the Related Art

There is a conventional communication device in which radio communication is established between a transmitter/receiver for performing speech communication and a communication device.

For example, there are facsimile devices similar to the above communication device. The facsimile device will be described below.

This facsimile device has a radio unit for performing radio communication with a transmitter/receiver, and a controller of the facsimile device controls the facsimile device and the radio unit. The controller controls the radio unit by a signal system inherent in the controller.

In a facsimile device in which radio communication is established between a transmitter/receiver and the facsimile device, when the transmitter/receiver receives an incoming notification to respond to the incoming notification, and the facsimile device performs an automatic receiving operation (so-called facsimile/telephone switching operation), a radio line between the transmitter/receiver and the facsimile device is suddenly cut off, or no notification is transmitted from the facsimile device to the transmitter/receiver even if the radio line is not cut off.

When communication between the transmitter/receiver and the facsimile device cannot be established due to radio wave jamming between the transmitter/receiver and the facsimile device, the transmitter/receiver outputs an alarm tone by an alarming unit built in the transmitter/receiver.

However, in such a conventional facsimile device, the controller of the facsimile device controls the radio unit by a radio system inherent in the controller. For this reason, the controller cannot control another type of radio unit.

More specifically, a radio unit cannot be shared by this facsimile device and another facsimile device, and radio units must be formed for the types of facsimile devices, respectively.

In a facsimile device in which radio communication between a transmitter/receiver and the facsimile device is established, when the transmitter/receiver receives an incoming notification to respond to the incoming notification, and the facsimile device performs an automatic receiving operation, a radio line between the transmitter/receiver and the facsimile device is suddenly cut off, or no notification is transmitted from the facsimile device to the transmitter/receiver even if the radio line is not cut off. For this reason, an operator who answers the notification with the transmitter/receiver suddenly hears noise.

When communication between the transmitter/receiver and the facsimile device cannot be established, since an alarm tone is output by an alarm unit built in the transmitter/receiver, a signal from the facsimile device can be received by the transmitter/receiver. However, when the facsimile device cannot receive a signal from the transmitter/receiver, the transmitter/receiver cannot recognize that communication with the facsimile device cannot be established, and the transmitter/receiver cannot make an alarm tone indicating disable communication.

SUMMARY OF THE INVENTION

It is an object of the present invention that a radio unit, included in a communication device, for performing radio communication can be replaced with another type of radio unit.

It is another object of the present invention that an interface for exchanging a control signal between a radio unit for performing radio communication and a communication device performing communication through a communication line is shared by different types of radio units.

It is still another object of the present invention that a control signal exchanged between a radio unit for performing radio communication and a communication device performing communication through a communication line is shared among different types of radio units.

It is still another object of the present invention that when communication using a radio unit is switched to communication without a radio unit, the radio unit notifies a communication device which is performing radio communication that the communications are switched.

Still another object of the present invention will be apparent from the following specification and drawings.

BRIEF DESCRIPTION OF THE DRAWINGS

FIG. 2 is a table showing control signals transmitted from a facsimile controller (FAX CPU) according to the embodiment of the present invention to a radio controller (CT CPU) of a radio unit of the facsimile device.

FIG. 3 is a table showing control signals transmitted from the facsimile controller (FAX CPU) according to the embodiment of the present invention to the radio controller (CT CPU) of the radio unit of the facsimile device.

FIG. 4, consisting of FIGS. 4A and 4B, is a table showing control signals transmitted from the radio controller (CT CPU) of the radio unit of the facsimile device according to the embodiment of the present invention to the facsimile controller (FAX CPU).

FIG. 5 is a table showing control signals transmitted from the radio controller (CT CPU) of the radio unit of the facsimile device according to the embodiment of the present invention to the facsimile controller (FAX CPU).

FIG. 6, consisting of FIGS. 6A and 6B, is a table showing the bit patterns of the control signals transmitted from the facsimile controller (FAX CPU) according to the embodiment of the present invention to the radio controller (CT CPU) of the radio unit of the facsimile device.

FIG. 7, consisting of FIGS. 7A and 7B, is a table showing the bit patterns of control signals transmitted from the radio controller (CT CPU) of the radio unit of the facsimile device according to the embodiment of the present invention to the facsimile controller (FAX CPU).

FIG. 39 is a flow chart showing an operation of the radio controller (CT CPU) of the radio unit when an extension telephone of the facsimile device according to the embodiment of the present invention is in an out-of-range state.

FIG. 40 is a flow chart showing an operation of the controller of an extension telephone when the extension telephone of the facsimile device according to the embodiment of the present invention is in an out-of-range state.

DESCRIPTION OF THE PREFERRED EMBODIMENT

An embodiment of the present invention will be described below with reference to the accompanying drawings.

In the following embodiment, a facsimile device will be exemplified as a communication device.

Figure 1:
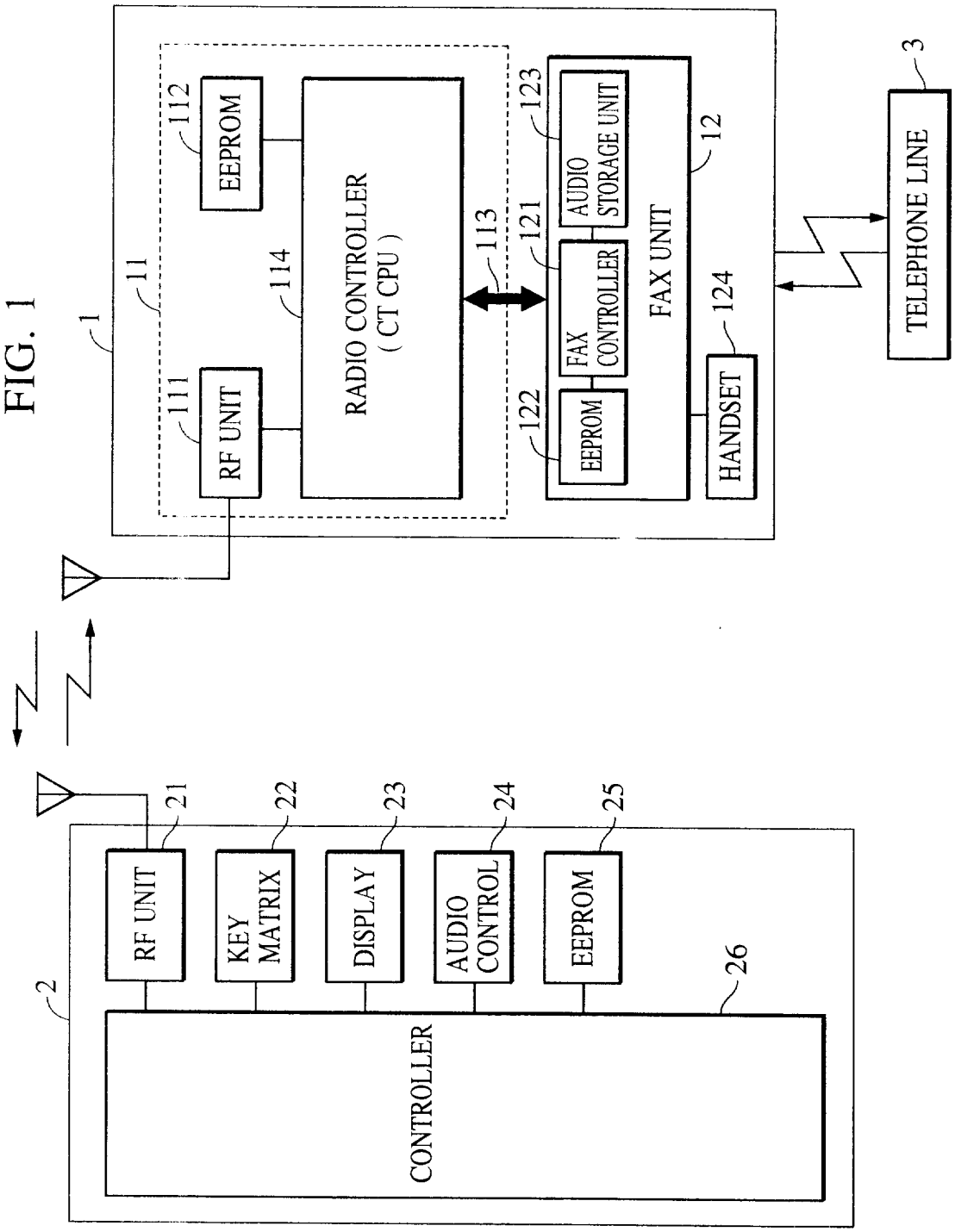
FIG. 1 is a view showing the arrangement of a facsimile device according to an embodiment of the present invention.

FIG. 1 is a block diagram showing a facsimile device according to this embodiment.

Referring to FIG. 1, reference numeral 1 denotes a facsimile device, and reference numeral 2 denotes an extension telephone which performs radio communication with the facsimile device 1. A telephone line 3 is connected to a facsimile device 1.

The facsimile device 1 is constituted by a radio unit 11 and a facsimile unit 12, and the facsimile device 1 and the facsimile unit 12 are connected to each other by an interface 113.

The radio unit 11 comprises: an RF unit 111 which converts a signal from the telephone line 3 or a signal from a handset 124 arranged in the facsimile device 1 into a radio signal when radio communication is performed between the facsimile device 1 and the extension telephone 2 to transmit the signal from an antenna, transmits the radio signal received from the extension telephone 2 to the telephone line 3, or which converts a radio signal received from the extension telephone 2 into a signal to be transmitted to the telephone line 3 or a signal to be transmitted to the handset 124 arranged in the facsimile device 1; an EEPROM 112 in which a control program for controlling the radio unit 11 is stored; and a radio controller 114 (to be referred to as a CT CPU hereinafter) for controlling the radio unit 11 according to the program in the EEPROM 112 to perform communication with the extension telephone 2.

The CT CPU 114 controls the radio unit 11 on the basis of a control signal from a facsimile controller 121 (to be referred to as a FAX CPU hereinafter) of the facsimile unit 12.

The facsimile unit 12 comprises: an EEPROM 122 in which a control program for controlling the facsimile unit 12 is stored; a facsimile controller 121 for controlling the facsimile unit 12 according to the control program in the EEPROM 122; and an audio storage unit 123 for storing a voice guidance output when the speech communication state of the extension telephone 2 is shifted to a facsimile communication state by remote control of the extension telephone 2, a response message used when the function of an automatic answer telephone is used, or a voice message output from a communication destination. The handset 124 for performing speech communication through the telephone line 3 or speech communication with the extension telephone 2 is connected to the facsimile unit 12.

The extension telephone 2 comprises: an RF unit 21 for converting a radio signal received from the facsimile device 1 into a signal to be controlled by a controller 26 or a signal to be output by an audio control 24 or converting a signal from the controller 26 or the audio control 24 into a radio signal to transmit the radio signal from an antenna; a key matrix 22 for performing various key operations; a display 23 for performing various display operations; the audio control 24 for inputting/outputting an audio signal; an EEPROM 25 in which a control program for controlling the extension telephone 2 is stored; and a controller 26 for controlling the extension telephone 2.

A control signal transmitted/received between the radio controller (CT CPU) 114 of the radio unit 11 of the facsimile device 1 and the controller 26 of the extension telephone 2, a method of transmitting/receiving the control signal, and a radio communication scheme (e.g., analog radio communication or digital radio communication) vary depending on the type of facsimile device like a conventional control signal transmitted/received by a facsimile device which establishes radio communication between an extension telephone and the facsimile device, a conventional method of transmitting/receiving the control signal, and a conventional radio communication scheme. However, a control signal transmitted/received by the interface 113 between the facsimile controller (FAX CPU) 121 and the radio controller (CT CPU) 114, a method of transmitting/receiving the control signal, and the interface 113 are commonly used independently of the type facsimile device or the type of radio unit.

FIGS. 2 and 3 show a control signal transmitted from the facsimile controller (FAX CPU) 121 to the radio controller (CT CPU) 114, and FIGS. 4 and 5 show a control signal transmitted from the radio controller (CT CPU) 114 to the facsimile controller (FAX CPU) 121.

FIG. 6 shows the bit pattern of the control signal transmitted from the facsimile controller (FAX CPU) 121 to the radio controller (CT CPU) 114, and FIG. 7 shows the bit pattern of a control signal transmitted from the radio controller (CT CPU) 114 to the facsimile controller (FAX CPU) 121.

Figure 8:
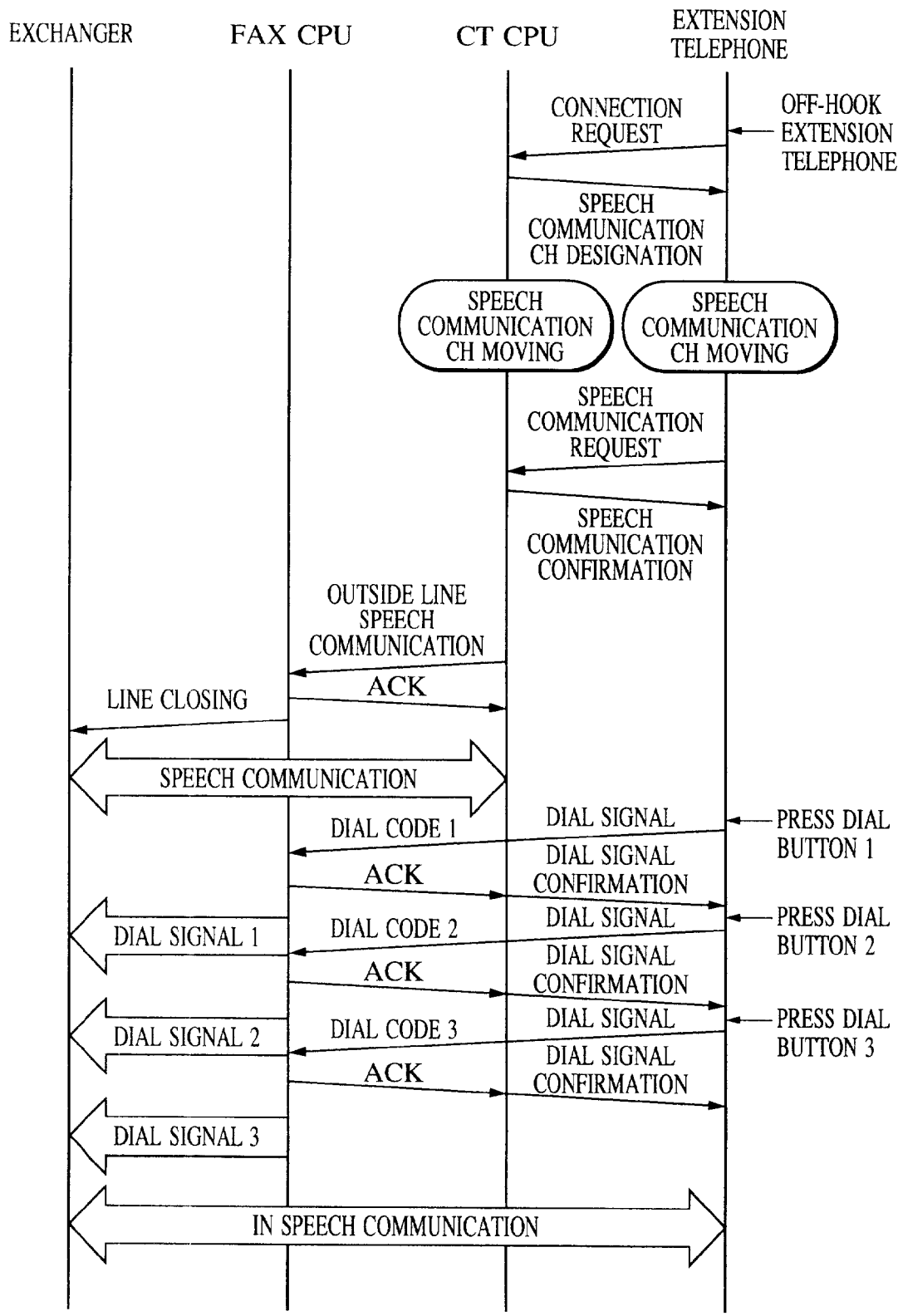
FIG. 8 is a sequence chart showing an operation performed in outside line outgoing from an extension telephone of the facsimile device according to the embodiment of the present invention.

FIG. 8 shows an operation sequence performed when outside line outgoing is performed from the extension telephone 2 through the facsimile device 1.

Referring to FIG. 8, when an off-hook button is pressed by the key matrix 22 of the extension telephone 2, the controller 26 of the extension telephone 2 transmits a connection request signal to the facsimile device 1 through the RF unit 21. The radio controller (CT CPU) 114 of the radio unit 11 which receives the connection request signal finds an empty speech communication channel, and transmits a speech communication channel designation signal for designating the speech communication channel to the extension telephone 2. The radio controller (CT CPU) 114 shifts from the control channel to the speech communication channel.

The controller 26 of the extension telephone 2 which receives the speech communication channel designation signal shifts to a designated speech communication channel, and transmits the speech communication request signal to the facsimile device 1 through the speech communication channel. The radio controller (CT CPU) 114 of the radio unit 11 which receives the speech communication request signal transmits the speech communication confirmation signal to the extension telephone 2, and transmits an outside speech communication command to the facsimile controller 121 (FAX CPU). The facsimile controller (FAX CPU) 121 sends an ACK back to the radio controller (CT CPU) 114 of the radio unit 11 when the facsimile controller (FAX CPU) 121 receives the outside speech communication command from the radio controller (CT CPU) 114 of the radio unit 11, and transmits a signal for closing a line to an exchanger to close a DC loop, thereby setting a speech communication state.

When the controller 26 of the extension telephone 2 transmits a dial signal to the facsimile device 1 when a dial button is pressed by the operation of the key matrix 22. When the radio controller (CT CPU) 114 of the radio unit 11 receives the dial signal, the radio controller (CT CPU) 114 transmits the code of the dial signal to the facsimile controller (FAX CPU) 121.

When the facsimile controller (FAX CPU) 121 receives the code of the dial signal, the facsimile controller (FAX CPU) 121 transmits an ACK to the radio controller (CT CPU) 114 of the radio unit 11 to notify the radio controller (CT CPU) 114 that the facsimile controller (FAX CPU) 121 receives the code of the dial signal. The radio controller (CT CPU) 114 of the radio unit 11 which receives the ACK transmits a dial confirmation signal to the extension telephone 2 to notify the extension telephone 2 that the dial signal is normally received.

When the facsimile controller (FAX CPU) 121 receives the code of the dial signal, dial signals represented by the code is transmitted to the exchanger through the telephone line 3. When a communication destination represented by the dial signals responds to the dial signals, a speech communication state between the extension telephone 2 and the communication destination is established.

Figure 9:
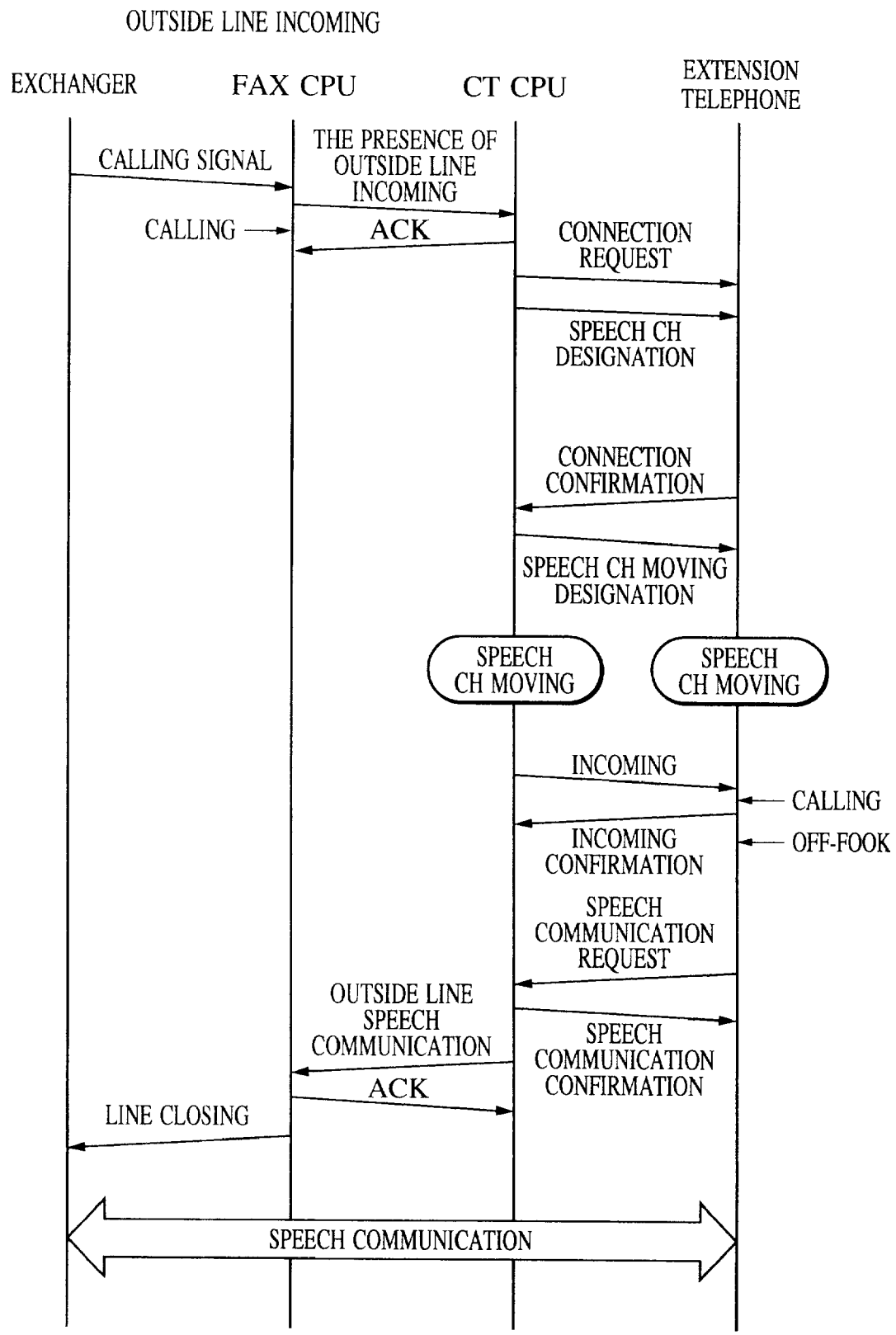
FIG. 9 is a sequence chart showing incoming from an outside line to the facsimile device according to the embodiment of the present invention.

FIG. 9 shows a sequence chart obtained when incoming is received from an outside line.

Referring to FIG. 9, when a calling signal is received from the exchanger such that outside line incoming occurs in the facsimile device 1, the facsimile controller (FAX CPU) 121 transmits a command representing the presence of outside line incoming to the radio controller (CT CPU) 114 of the radio unit 11, and calling is performed on the facsimile device 1 side to notify that incoming is present. When the radio controller (CT CPU) 114 of the radio unit 11 which receives the command representing the presence of outside line incoming sends an ACK back to the facsimile controller (FAX CPU) 121, and transmits a connection request signal and a speech communication designation signal for designating a speech communication channel to be used to the extension telephone 2 through a control channel.

When the extension telephone 2 receives the connection request signal and the speech communication channel designation signal, the extension telephone 2 transmits a connection confirmation signal to the facsimile device 1.

The radio controller (CT CPU) 114 of the radio unit 11 which receives the connection confirmation signal transmits a speech communication channel shift designation signal to the extension telephone 2 to shift to the channel. The extension telephone 2 which receives the speech communication channel shift designation signal also shifts to the speech communication channel.

When the radio controller (CT CPU) 114 of the radio unit 11 transmits an incoming signal to the extension telephone 2 to notify the extension telephone 2 of the presence of incoming. The extension telephone 2 which receives the incoming signal performs a calling operation to notify that incoming occurs, and transmits an incoming confirmation signal to the facsimile device 1.

When an off-hook operation is performed by the off-hook button of the key matrix 22 of the extension telephone 2, the controller 26 of the extension telephone 2 transmits a speech communication request signal to the facsimile device 1. When the radio controller (CT CPU) 114 of the radio unit 11 receives the speech communication request signal, the radio controller (CT CPU) 114 transmits the speech communication confirmation signal to the extension telephone 2 and transmits an outside line speech communication command to the facsimile controller (FAX CPU) 121. When the facsimile controller (FAX CPU) 121 receives the outside line speech communication command, the facsimile controller (FAX CPU) 121 sends the ACK back to the radio controller (CT CPU) 114 of the radio unit 11 and transmits a line closing state signal to the exchanger. Speech communication between the communication destination and the extension telephone is established.

Figure 10:
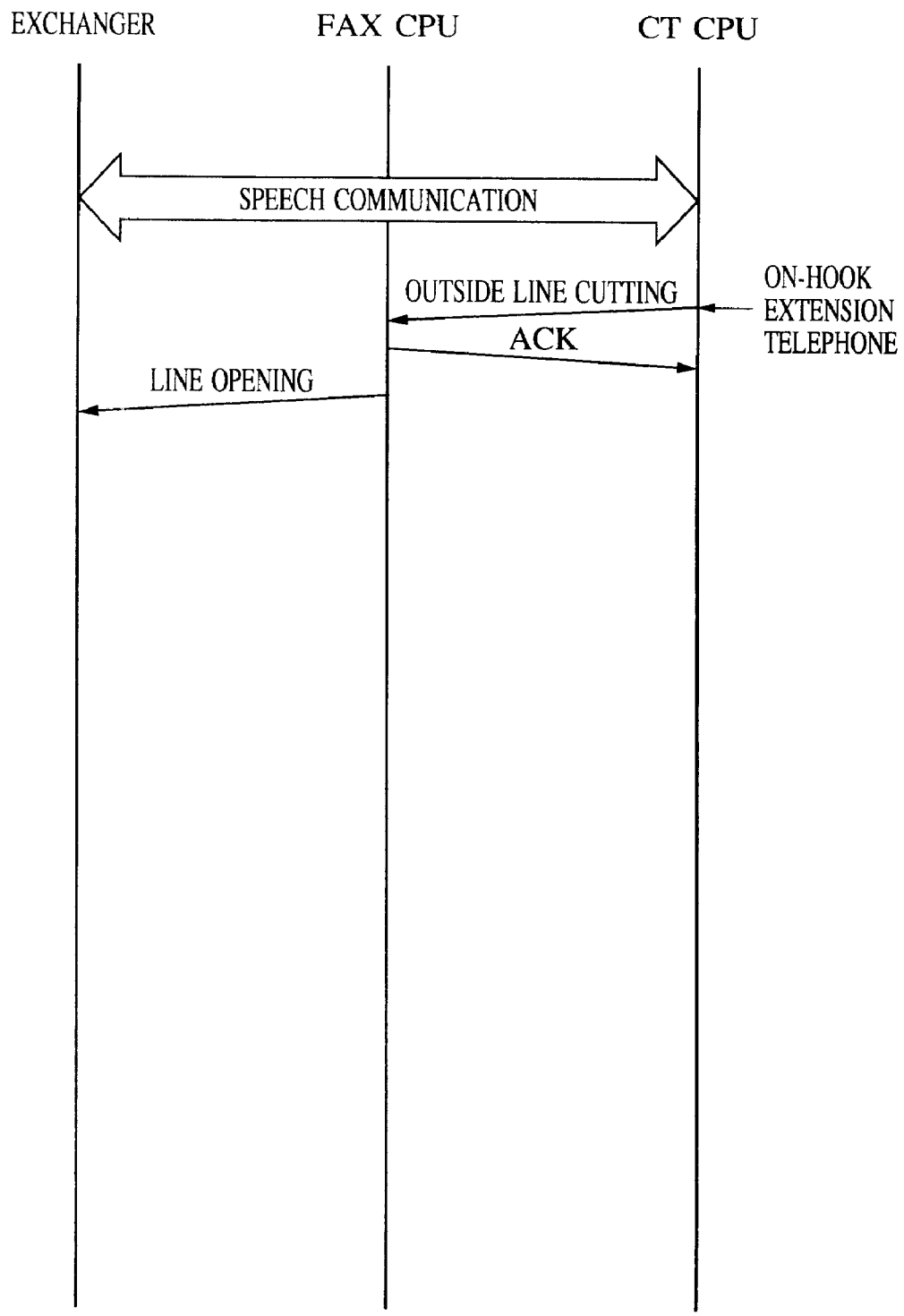
FIG. 10 is a sequence chart showing call cutting in the facsimile device according to the embodiment of the present invention.
Figure 11:
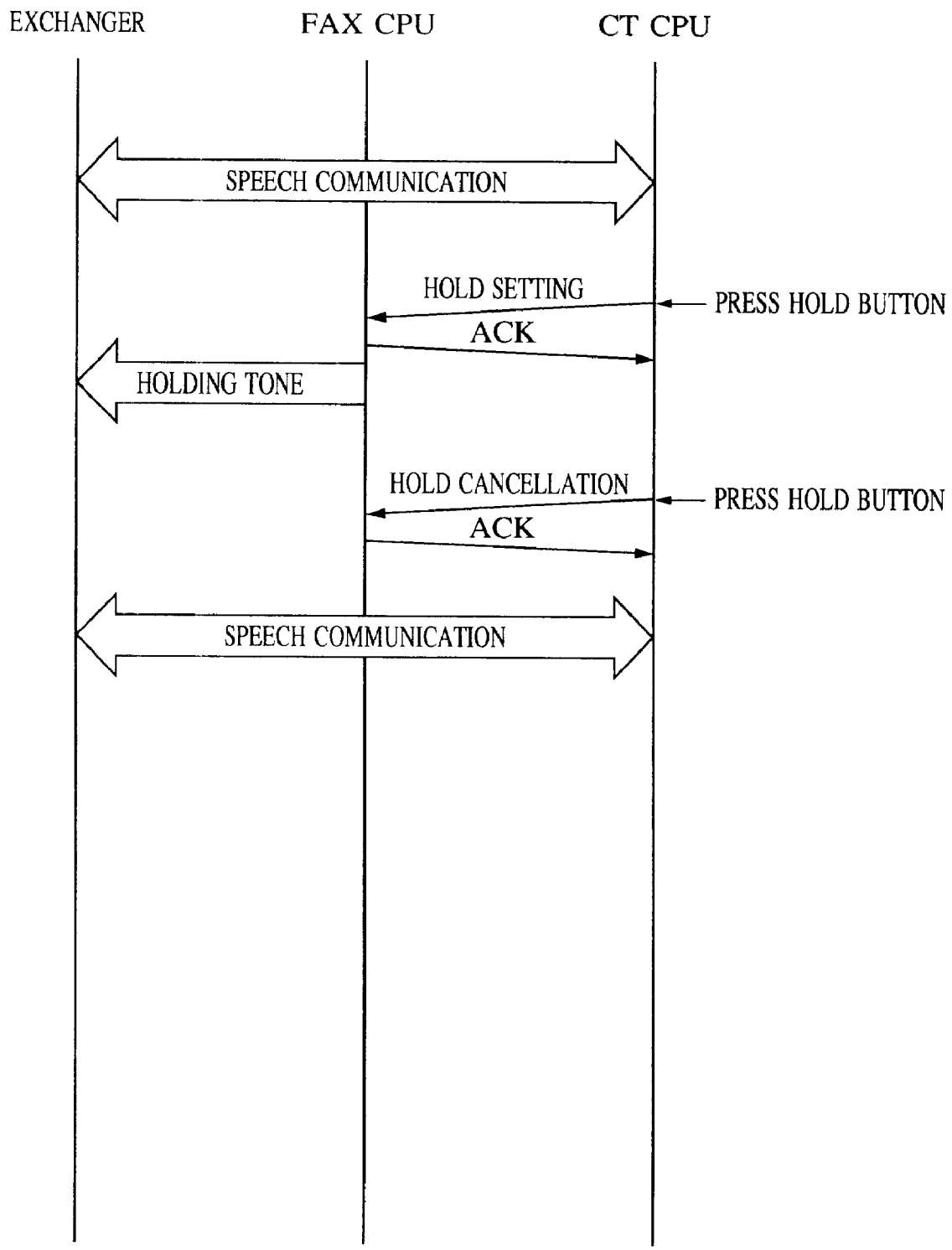
FIG. 11 is a sequence chart showing hold and hold cancellation in the facsimile device according to the embodiment of the present invention.
Figure 12:
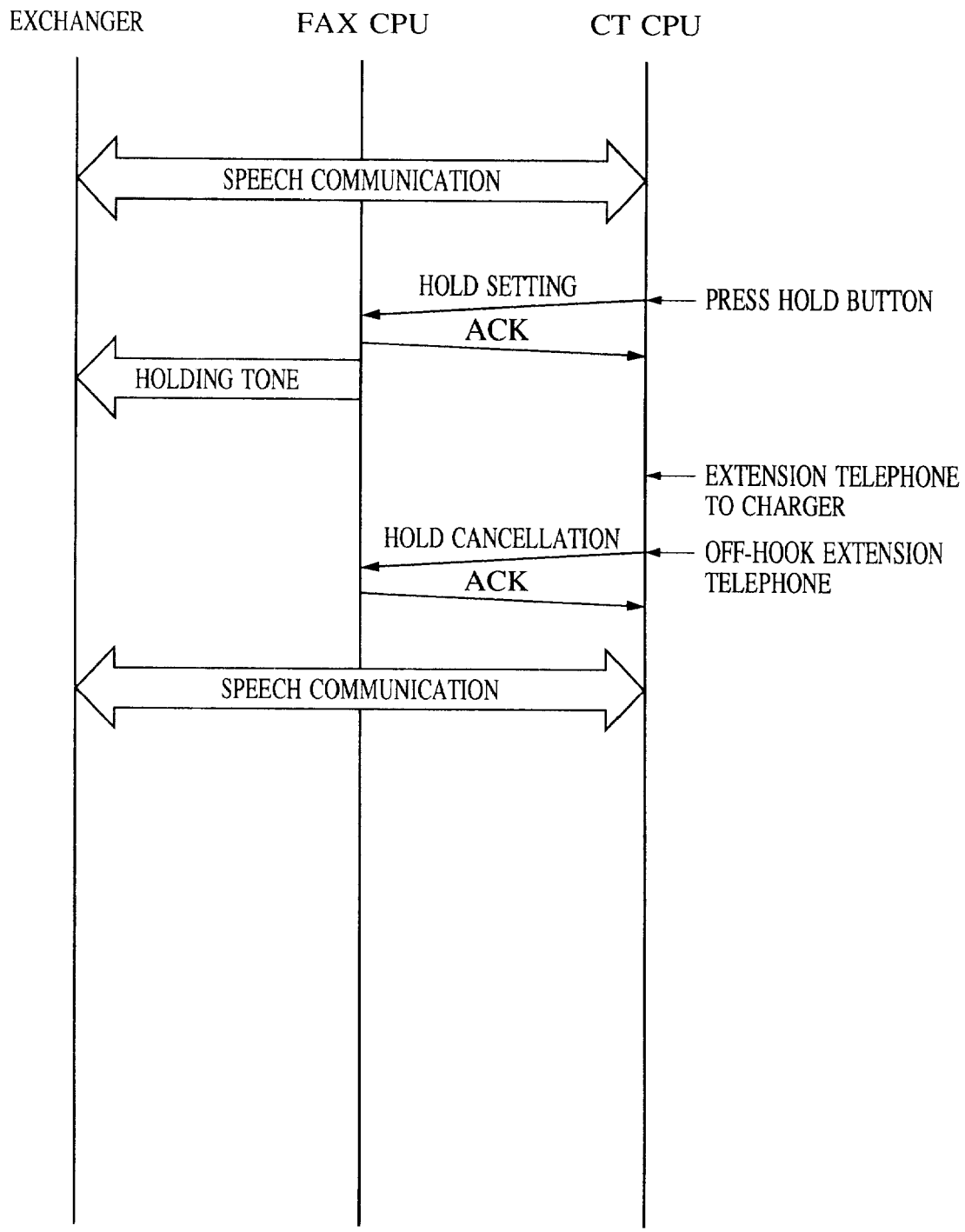
FIG. 12 is a sequence chart showing hold and hold cancellation in the facsimile device according to the embodiment of the present invention.
Figure 13:
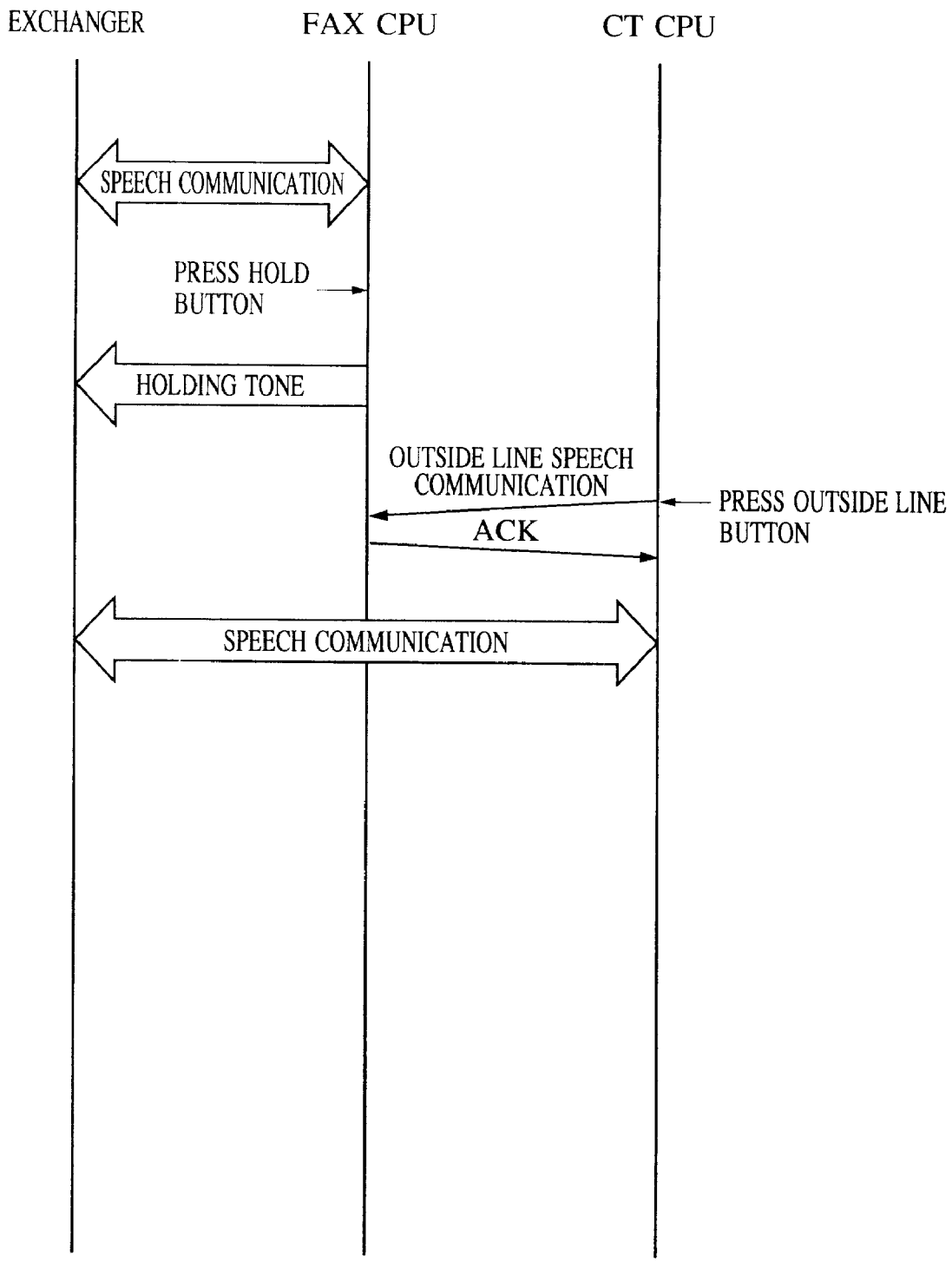
FIG. 13 is a sequence chart showing hold and hold cancellation in the facsimile device according to the embodiment of the present invention.
Figure 14:
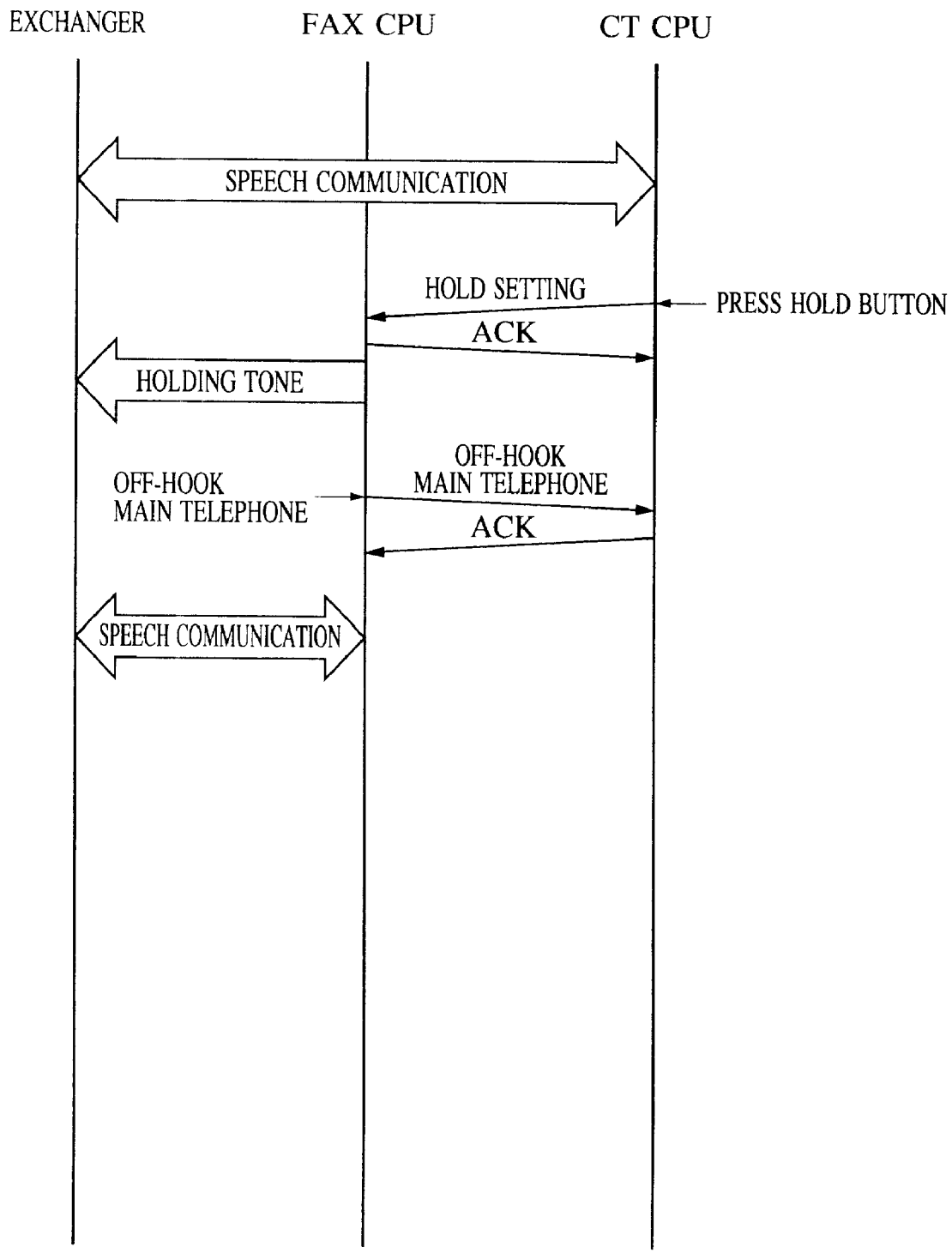
FIG. 14 is a sequence chart showing hold and hold cancellation in the facsimile device according to the embodiment of the present invention.
Figure 15:
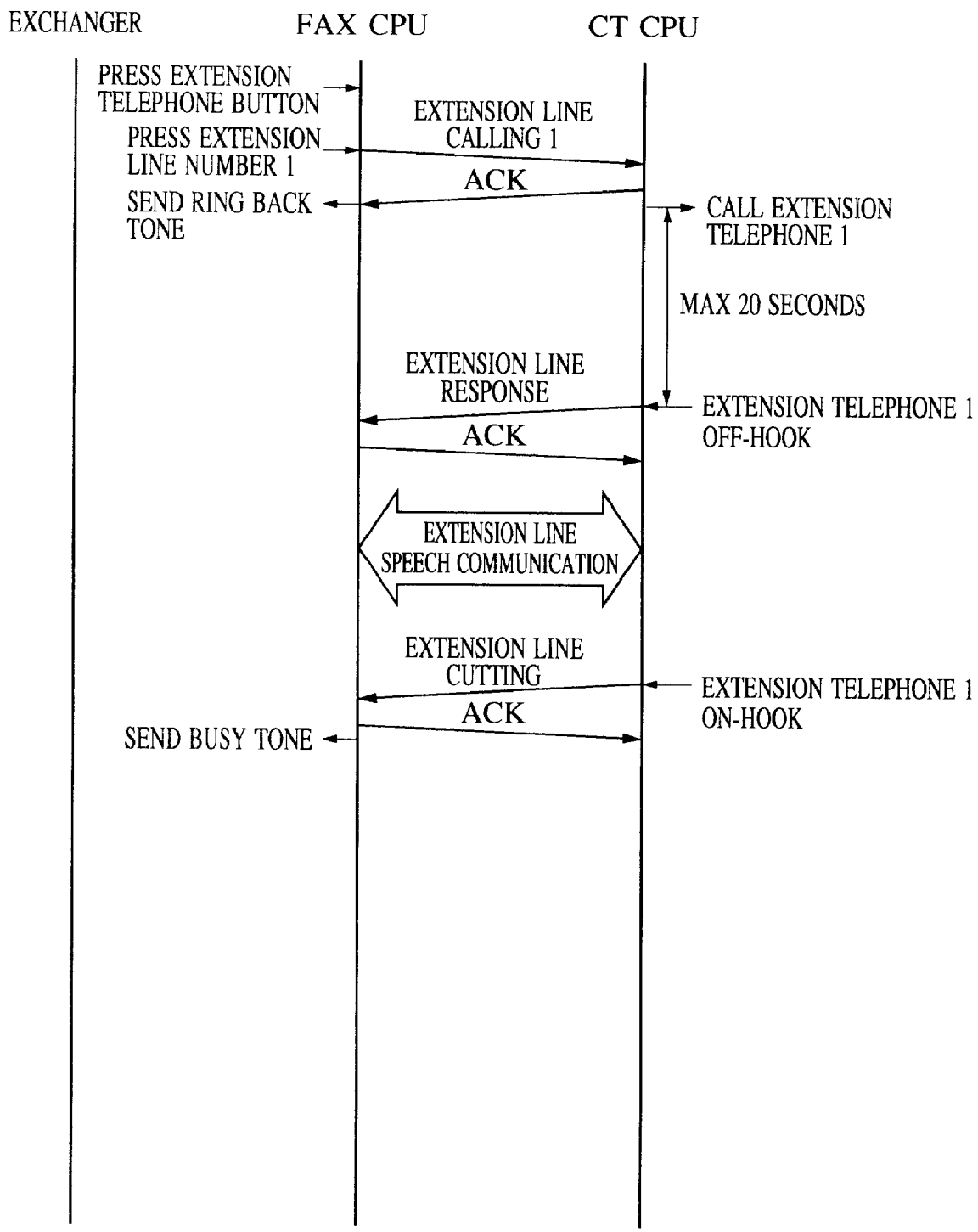
FIG. 15 is a sequence chart showing extension line speech communication in the facsimile device according to the embodiment of the present invention.
Figure 16:
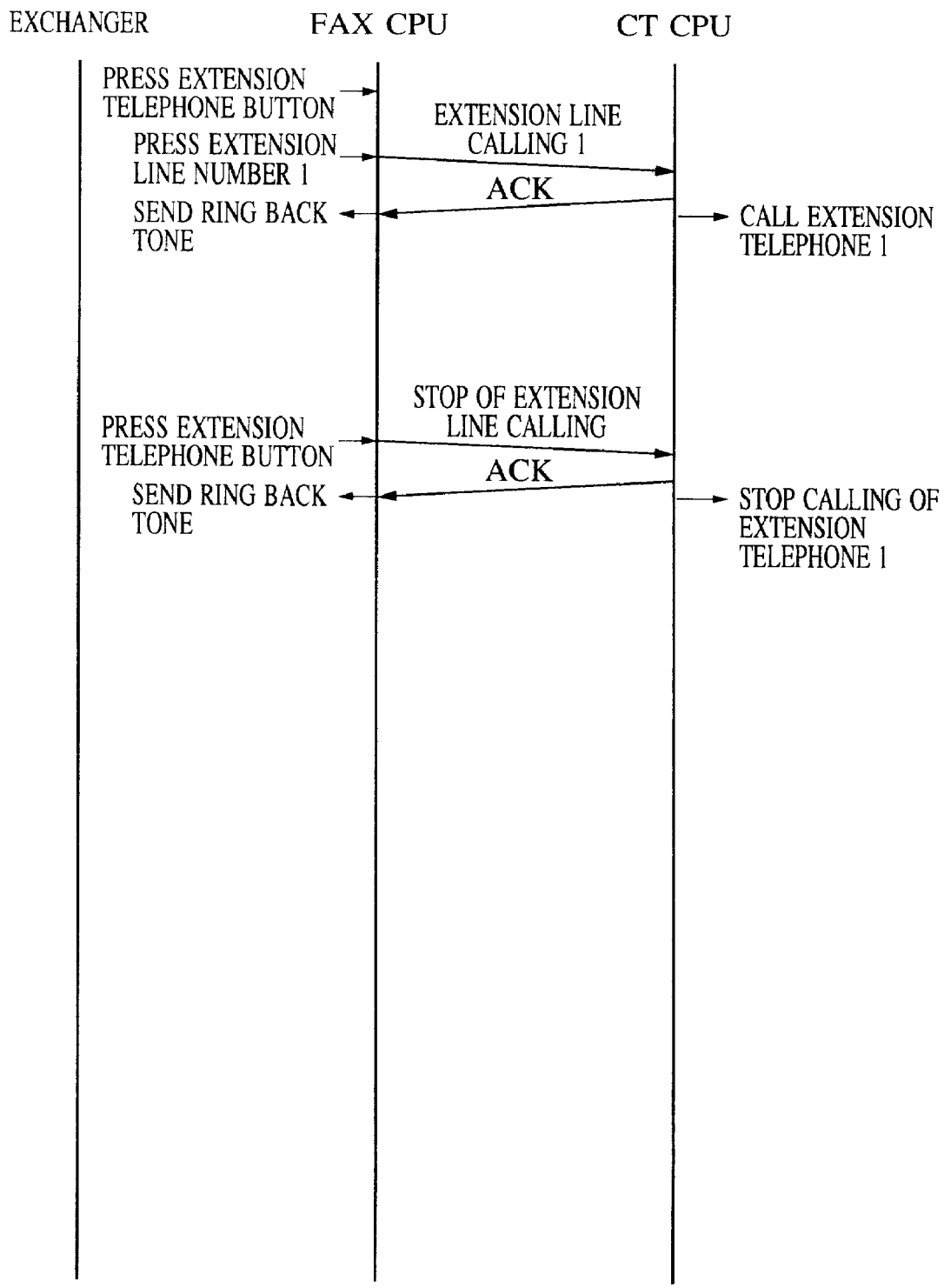
FIG. 16 is a sequence chart showing stop of extension line speech communication in the facsimile device according to the embodiment of the present invention.
Figure 17:
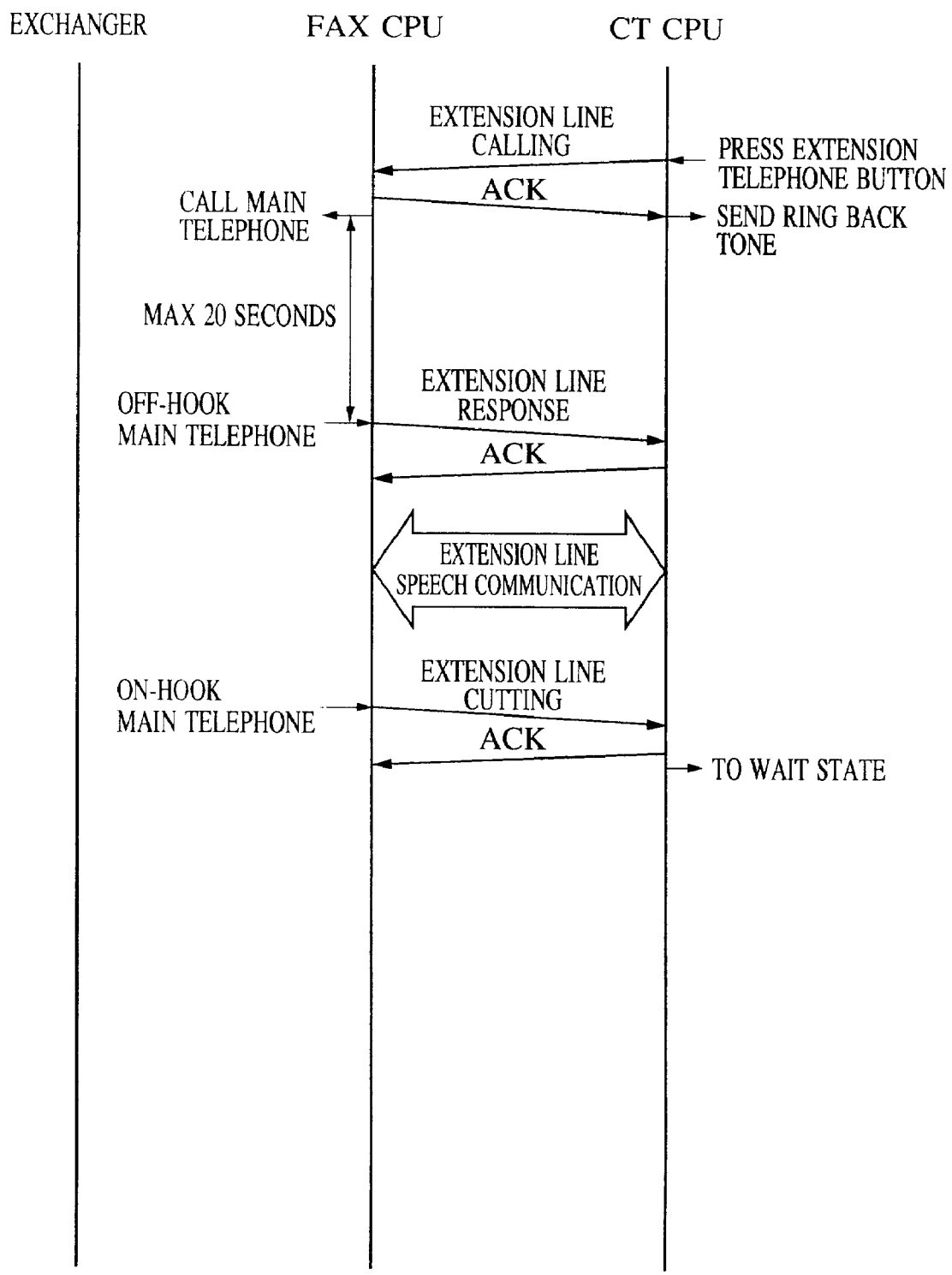
FIG. 17 is a sequence chart showing extension line speech communication in the facsimile device according to the embodiment of the present invention.
Figure 18:
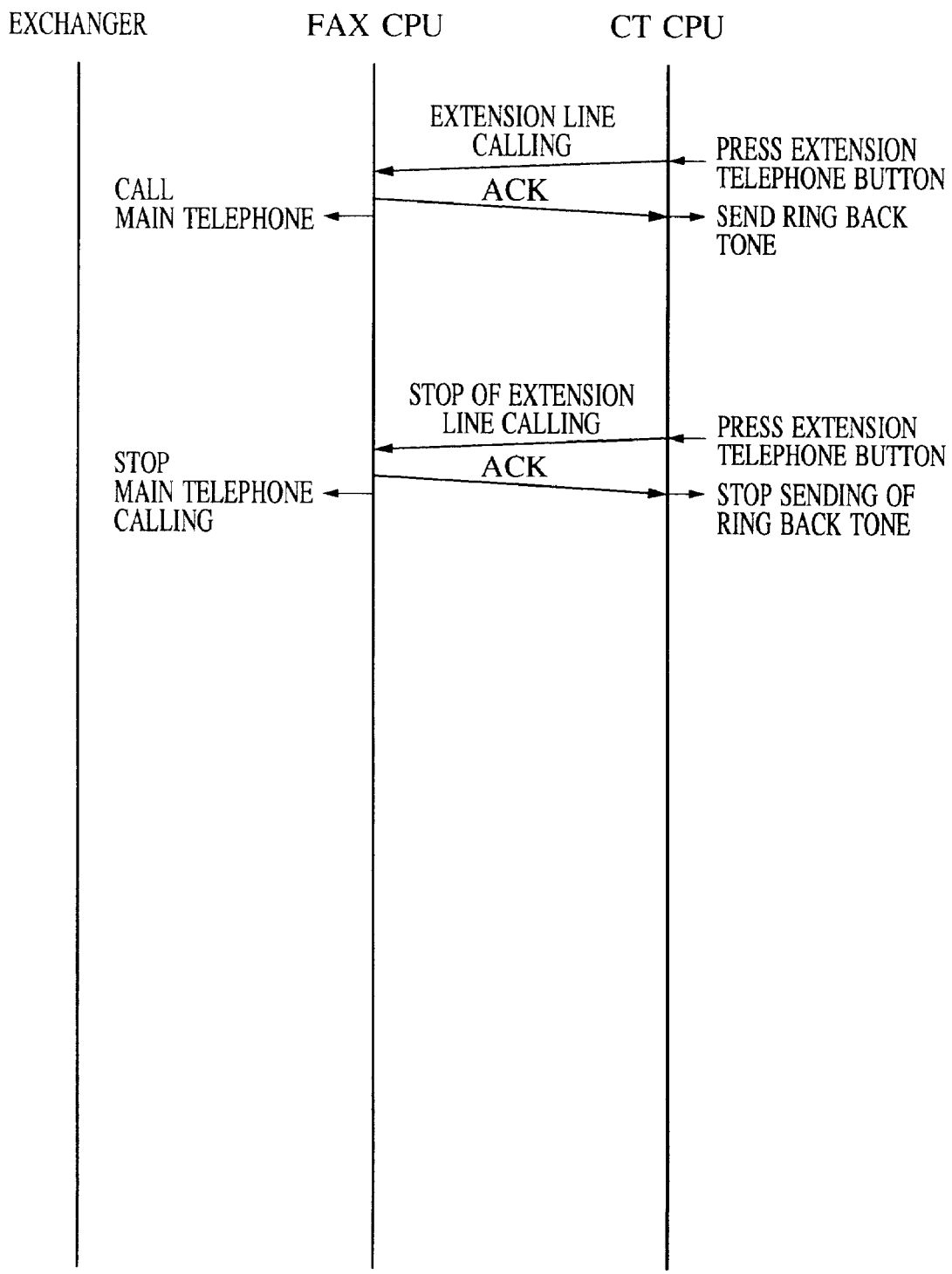
FIG. 18 is a sequence chart showing stop of extension line speech communication in the facsimile device according to the embodiment of the present invention.
Figure 19:
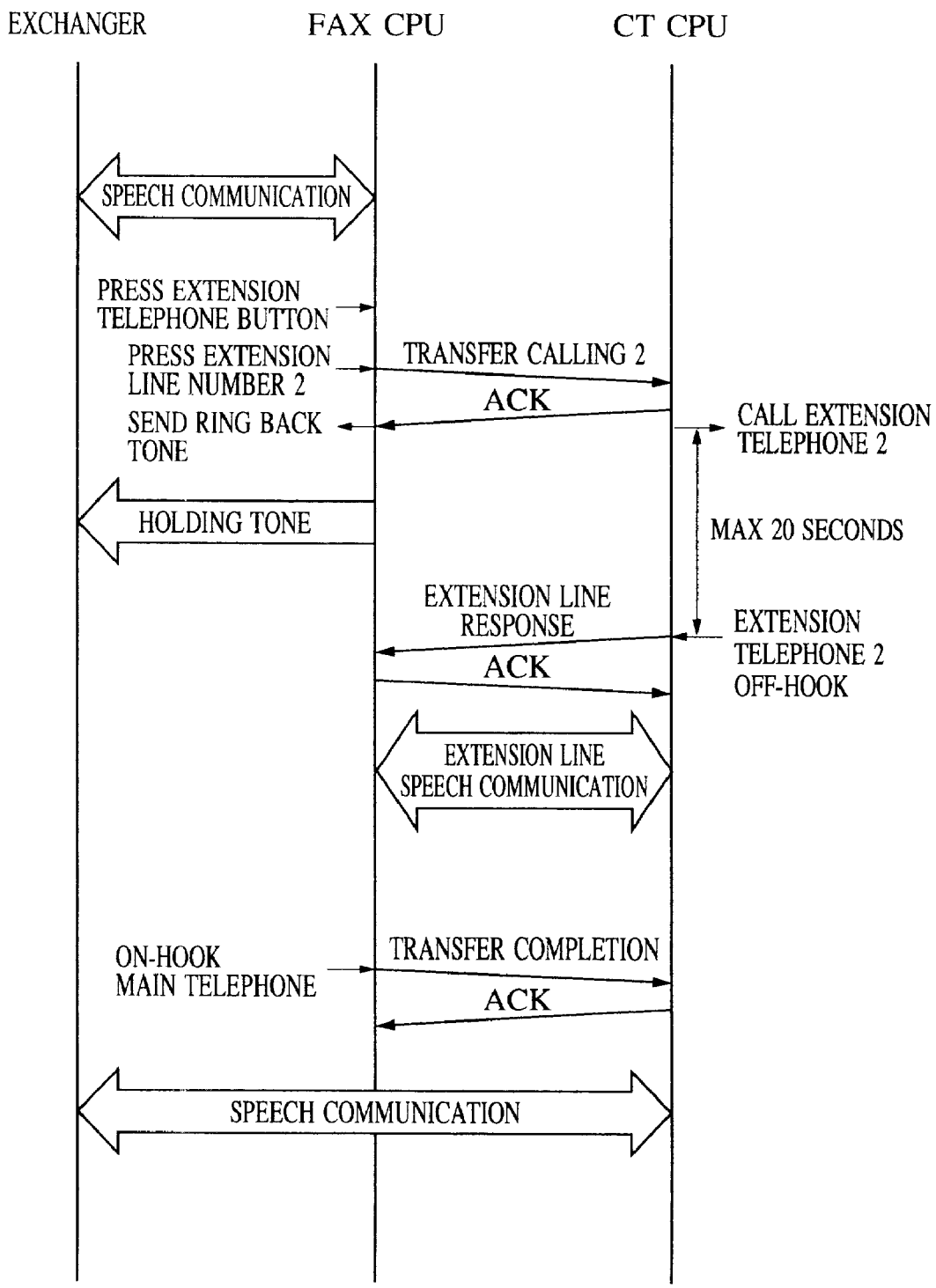
FIG. 19 is a sequence chart showing hold transfer in the facsimile device according to the embodiment of the present invention.
Figure 20:
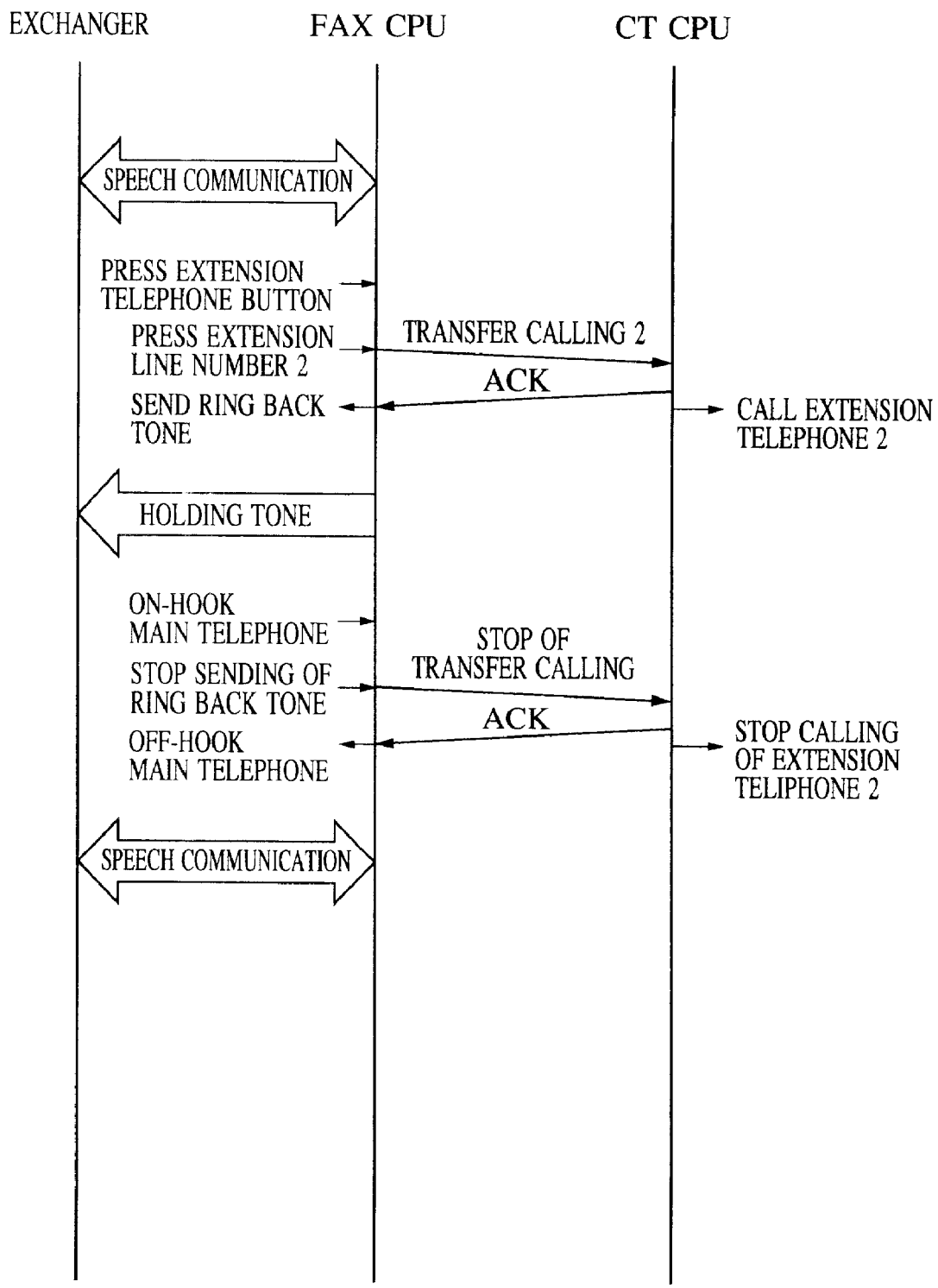
FIG. 20 is a sequence chart showing stop of hold transfer in the facsimile device according to the embodiment of the present invention.
Figure 21:
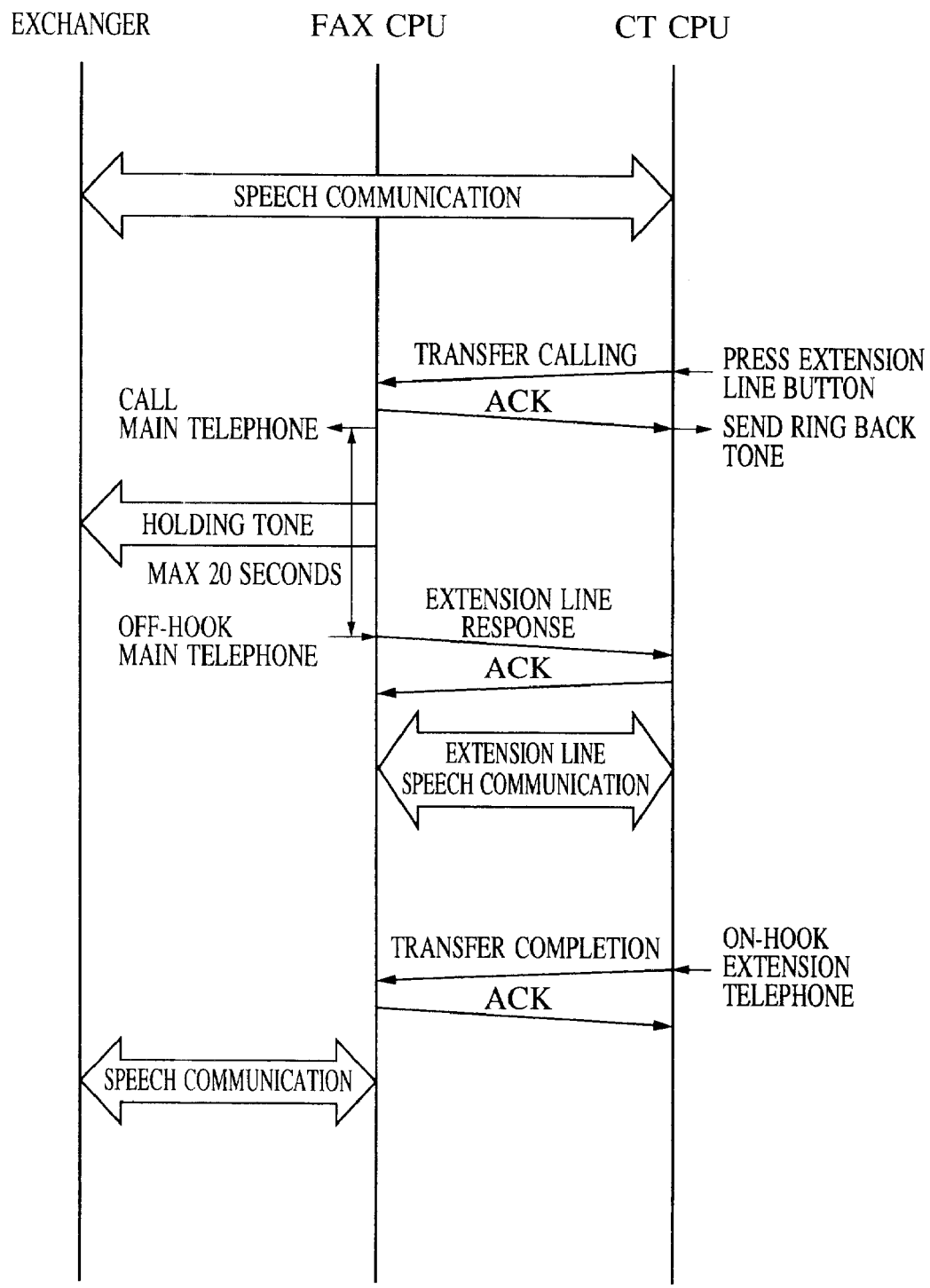
FIG. 21 is a sequence chart showing hold transfer in the facsimile device according to the embodiment of the present invention.
Figure 22:
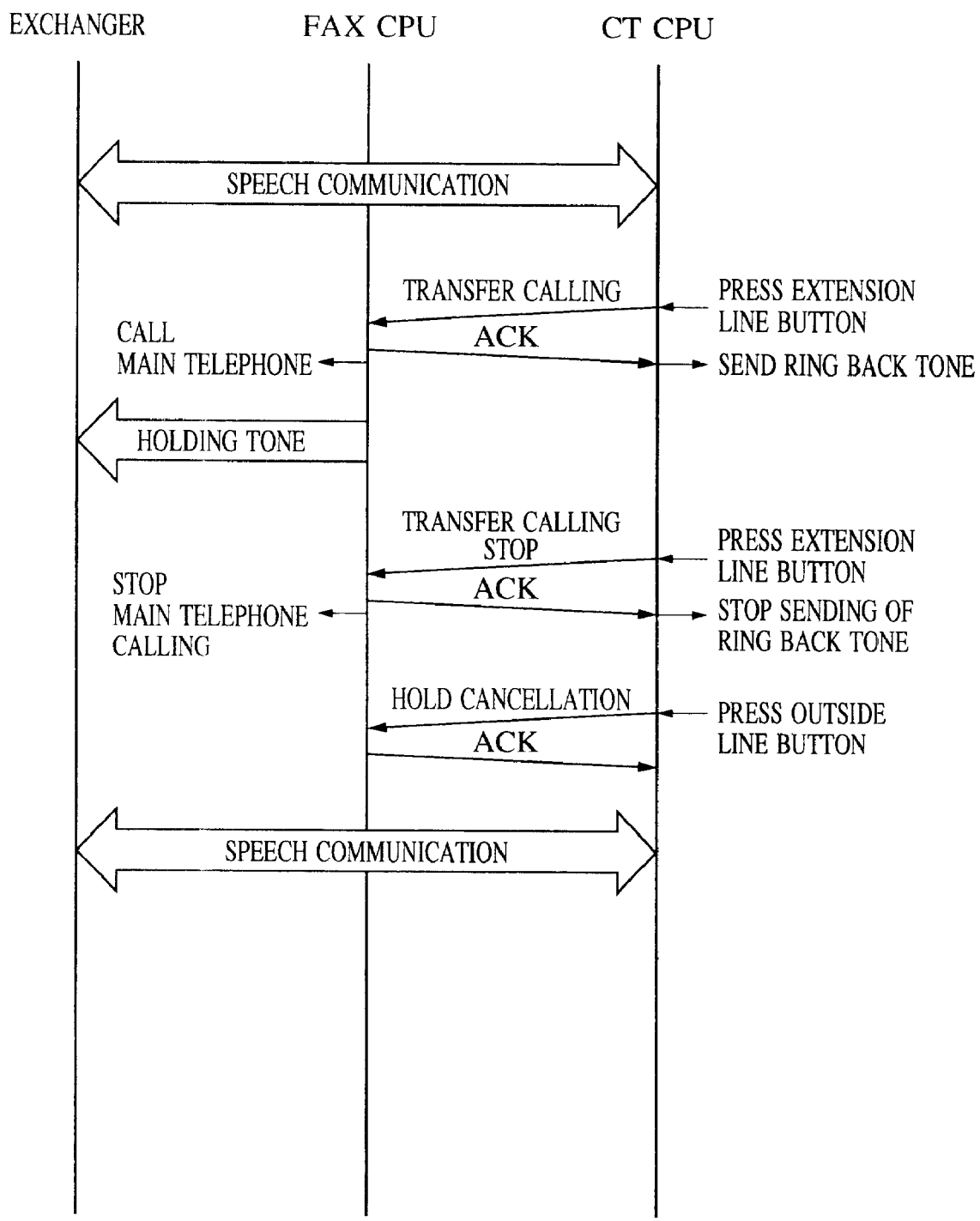
FIG. 22 is a sequence chart showing stop of hold transfer in the facsimile device according to the embodiment of the present invention.
Figure 23:
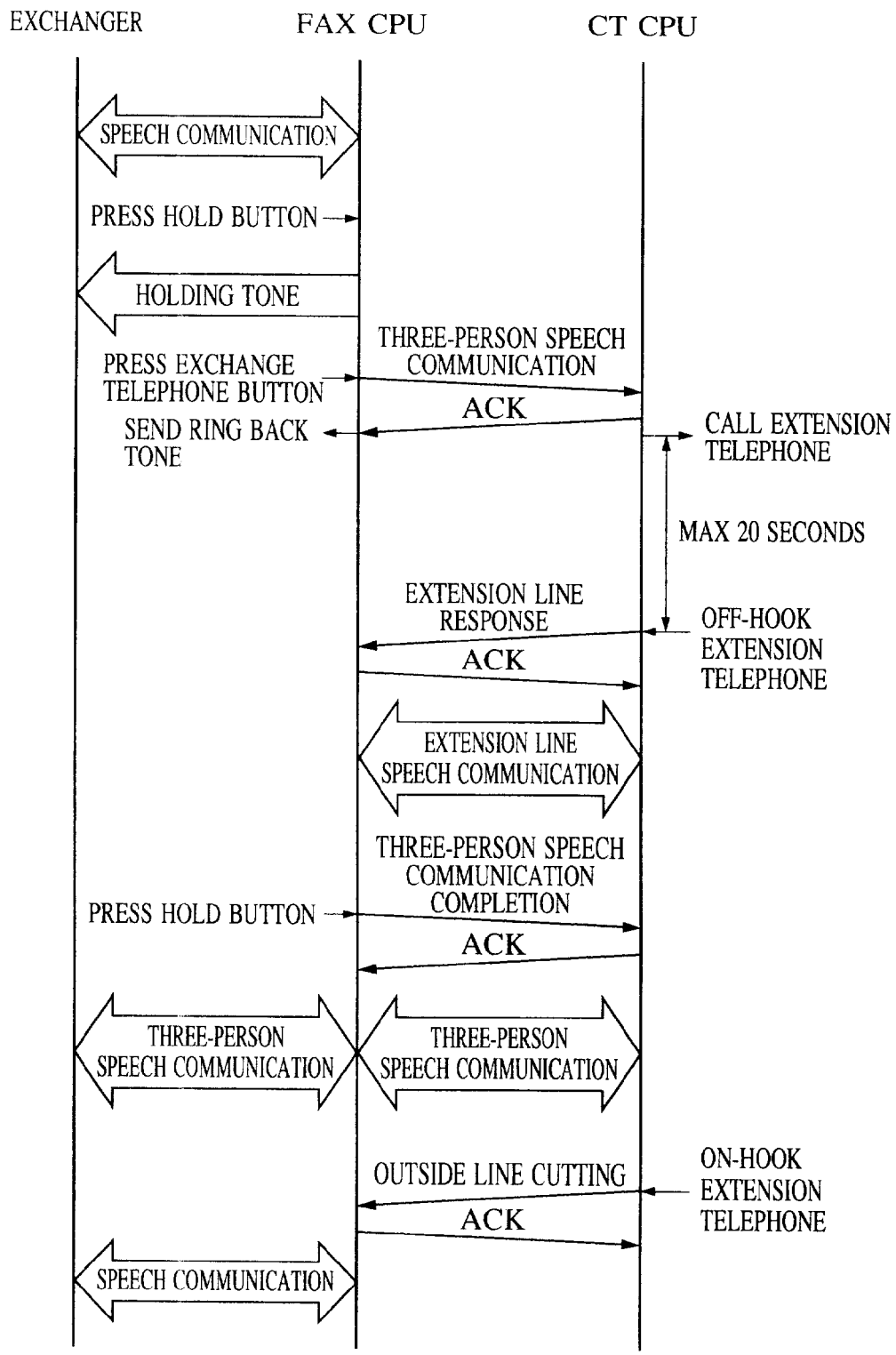
FIG. 23 is a sequence chart showing three-person speech communication in the facsimile device according to the embodiment of the present invention.
Figure 24:
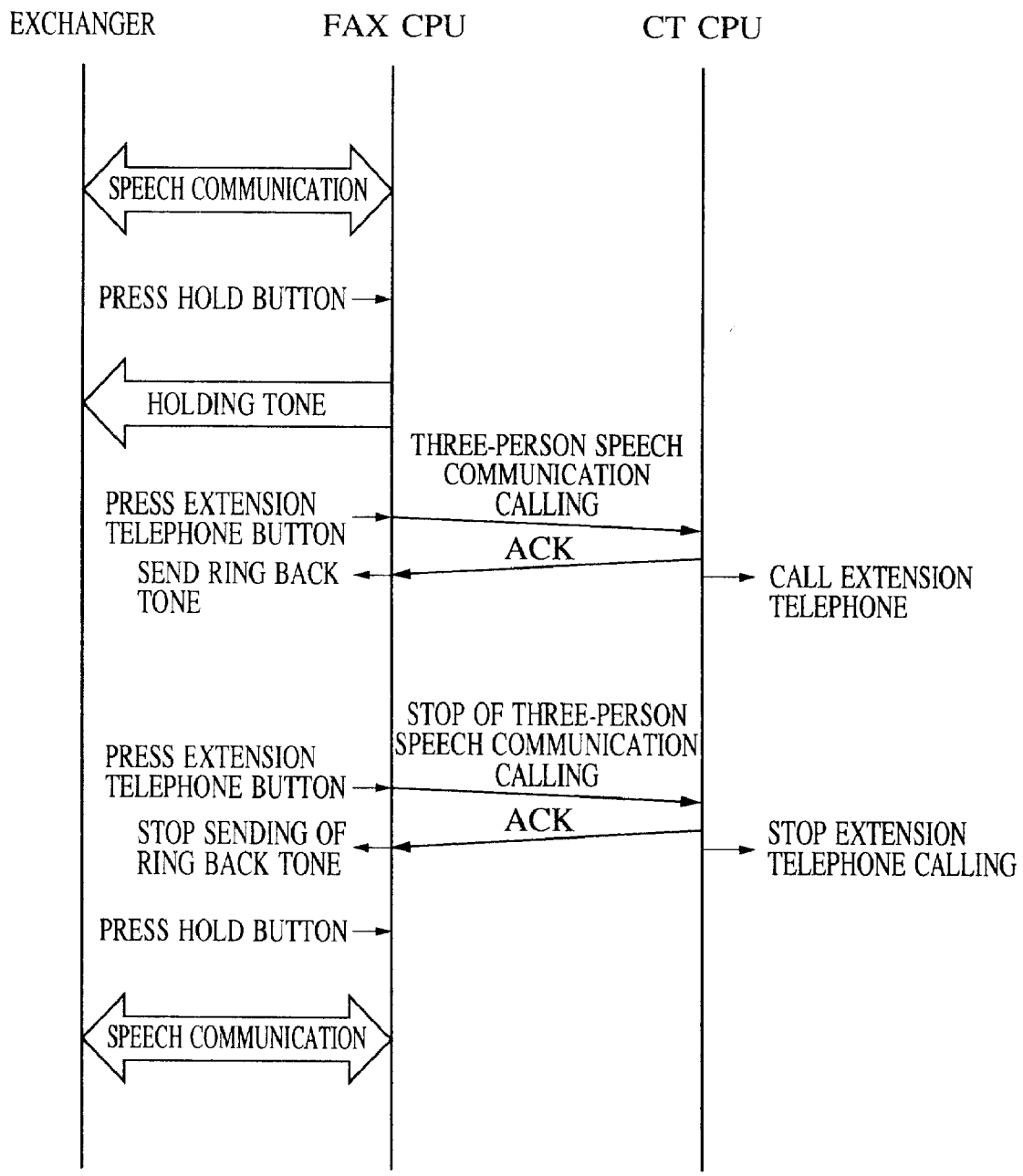
FIG. 24 is a sequence chart showing stop of three-person speech communication in the facsimile device according to the embodiment of the present invention.
Figure 25:
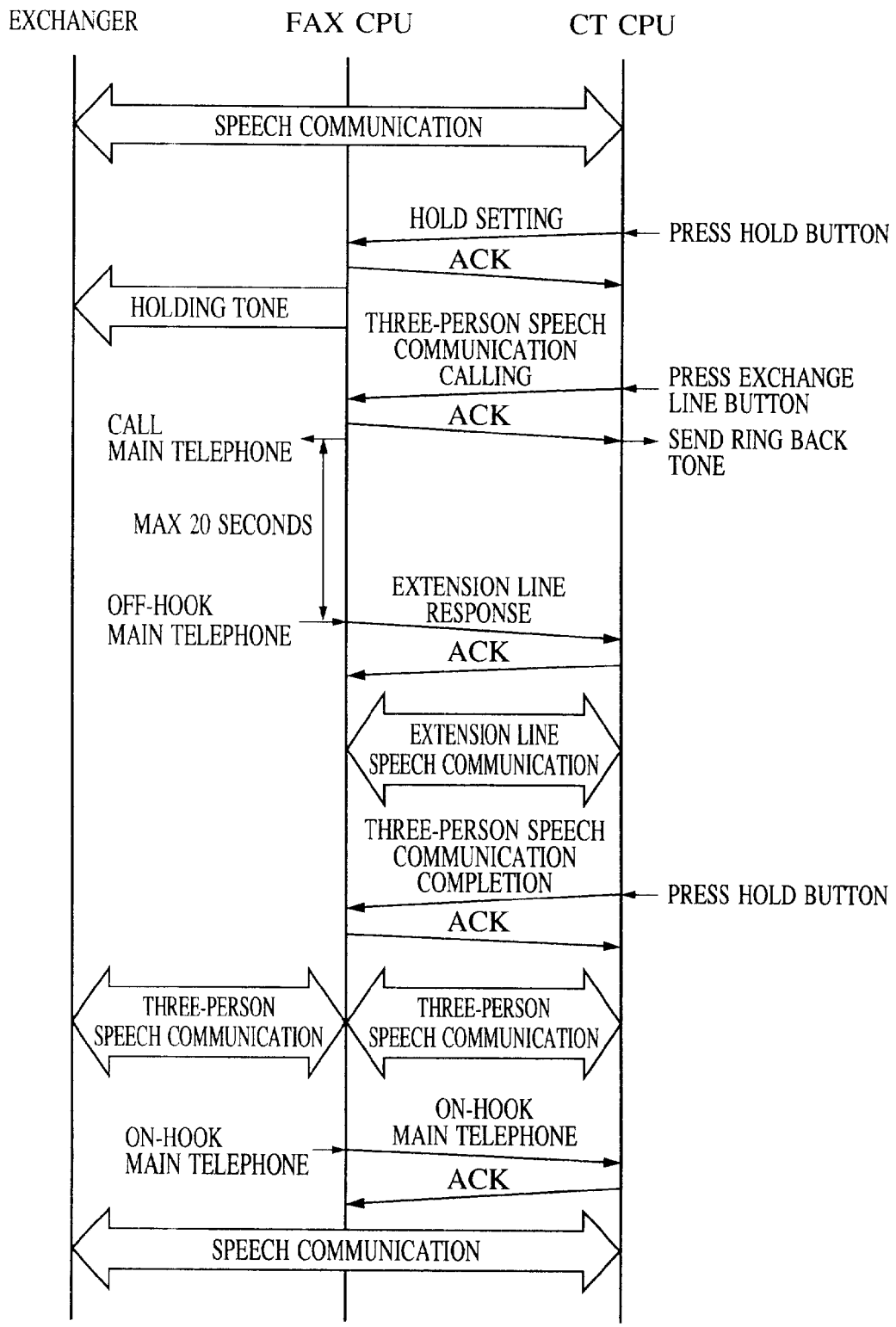
FIG. 25 is a sequence chart showing three-person speech communication in the facsimile device according to the embodiment of the present invention.
Figure 26:
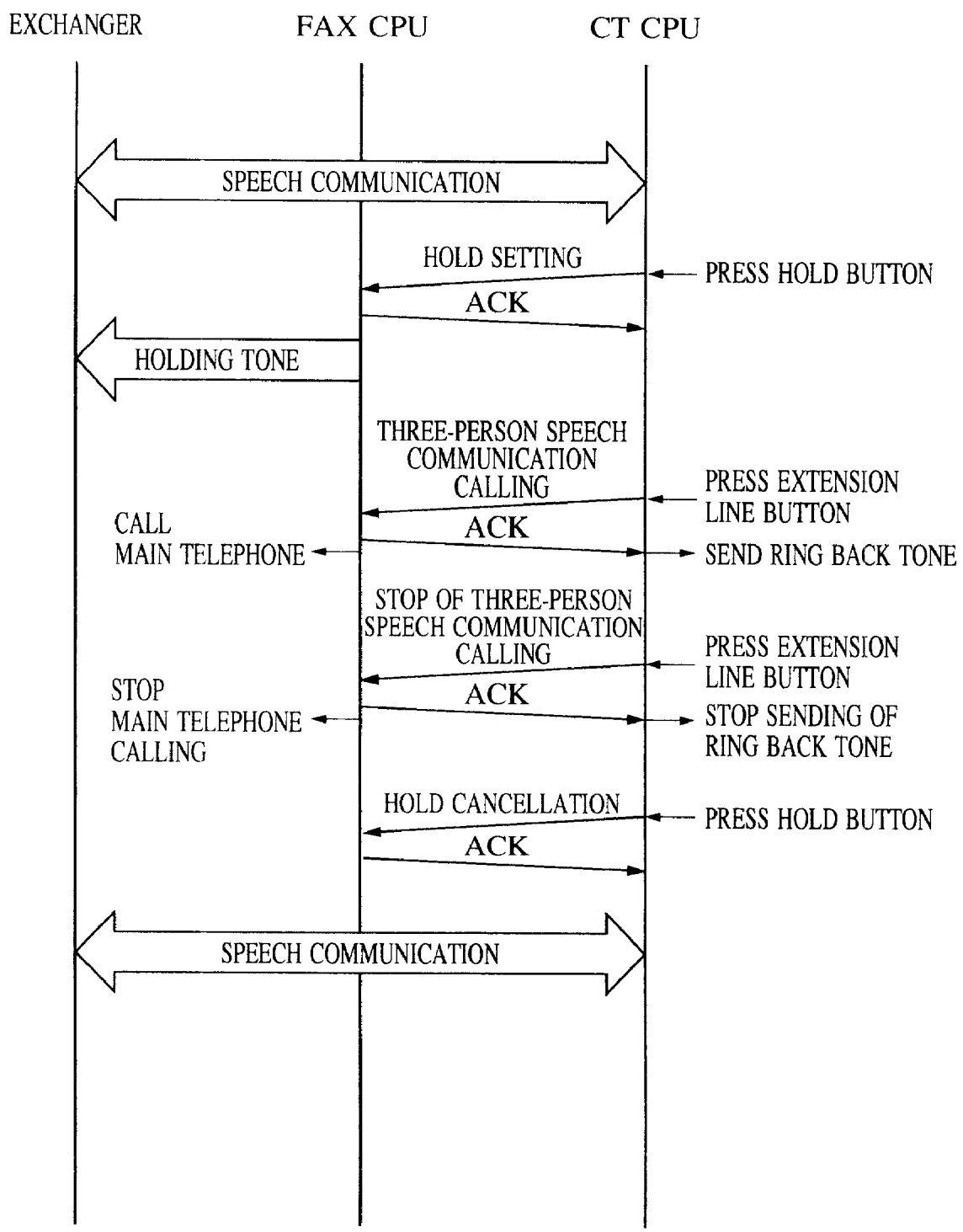
FIG. 26 is a sequence chart showing stop of three-person speech communication in the facsimile device according to the embodiment of the present invention.

FIG. 10 shows a sequence chart obtained when a call between the extension telephone 2 and a communication destination which are connected through the telephone line 3 is cut off.

FIGS. 11 to 14 show sequence charts obtained when a holding operation and a hold canceling operation.

FIGS. 15 to 18 show sequence charts obtained when extension line speech communication is performed between the facsimile device 1 and the extension telephone 2 and sequence charts obtained when the extension line speech communication is stopped.

FIGS. 19 to 22 show sequence charts obtained when hold transfer is performed between the facsimile device 1 and the extension telephone 2 and sequence charts obtained when the hold transfer is stopped.

FIGS. 23 to 26 show sequence charts obtained when three-person speech communication is performed and sequence charts obtained when the three-person speech communication is stopped.

Figure 27:
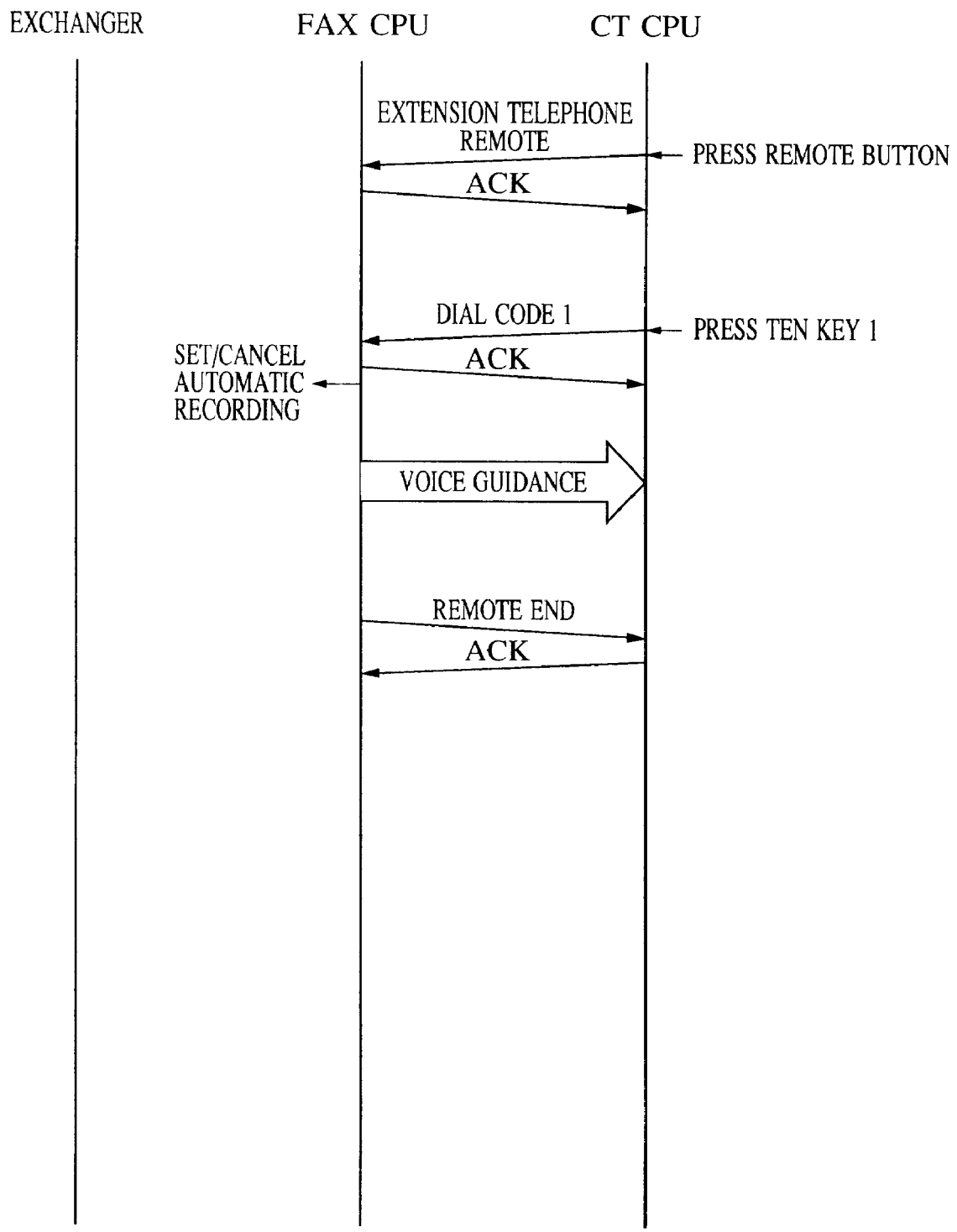
FIG. 27 is a sequence chart showing automatic recording set/canceled by remote control of an extension telephone of the facsimile device according to the embodiment of the present invention.
Figure 28:
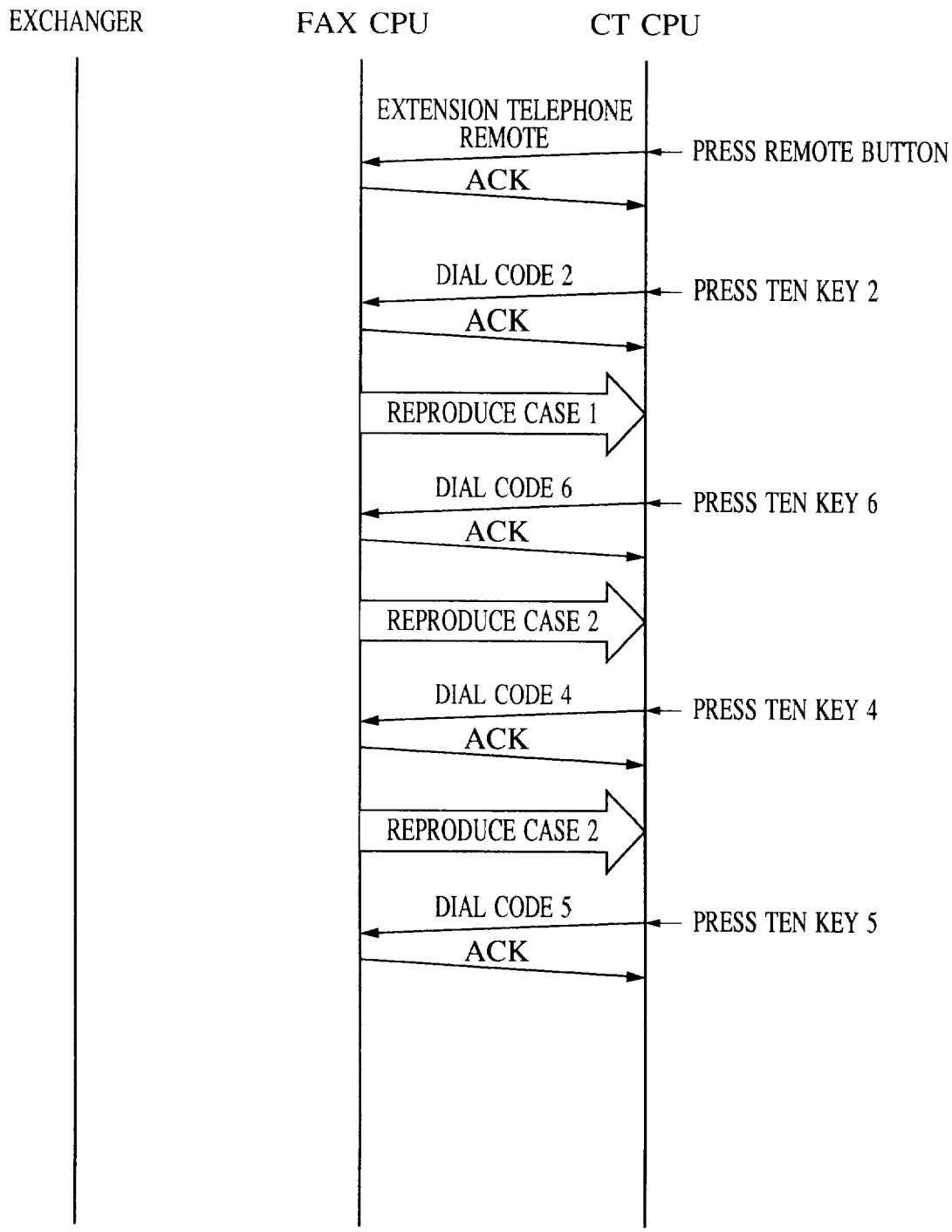
FIG. 28 is a sequence chart showing recording/reproducing of an automatic answer telephone by remote control of an extension telephone of the facsimile device according to the embodiment of the present invention.
Figure 29:
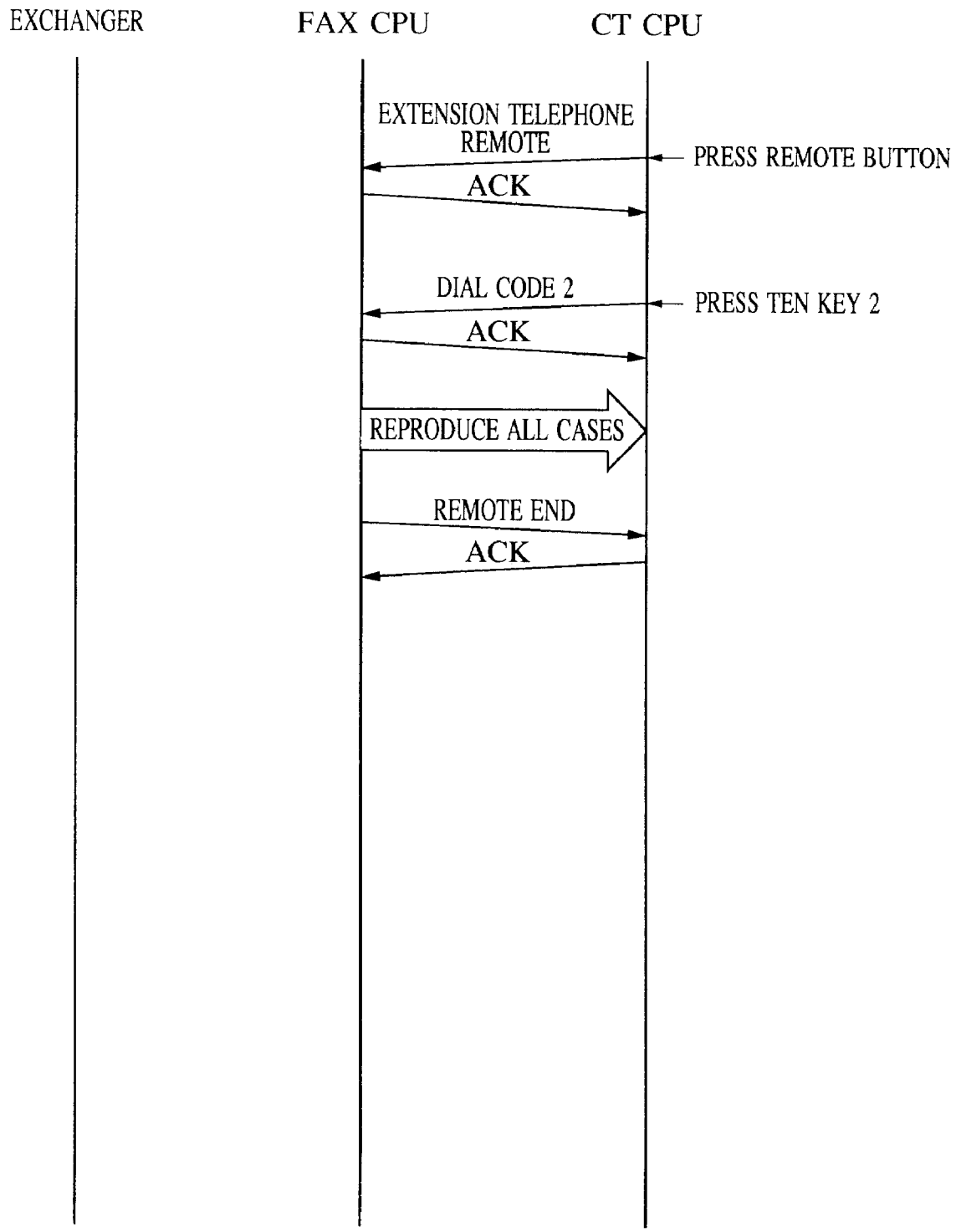
FIG. 29 is a sequence chart showing recording/reproducing of an automatic answer telephone by remote control of an extension telephone of the facsimile device according to the embodiment of the present invention.

FIG. 27 shows a sequence chart obtained when an automatic answer telephone is set and canceled by remote control of the extension telephone 2, and FIGS. 28 and 29 show sequence charts obtained when a message recorded on the automatic answer telephone is reproduced by remote control of the extension telephone 2.

Referring to FIGS. 10 to 29, the control signal shown in these drawings is transmitted/received between the facsimile controller (FAX CPU) 121 and the radio controller (CT CPU) 114 of the facsimile device 1 and the controller 26 of the extension telephone 2.

Figure 30:
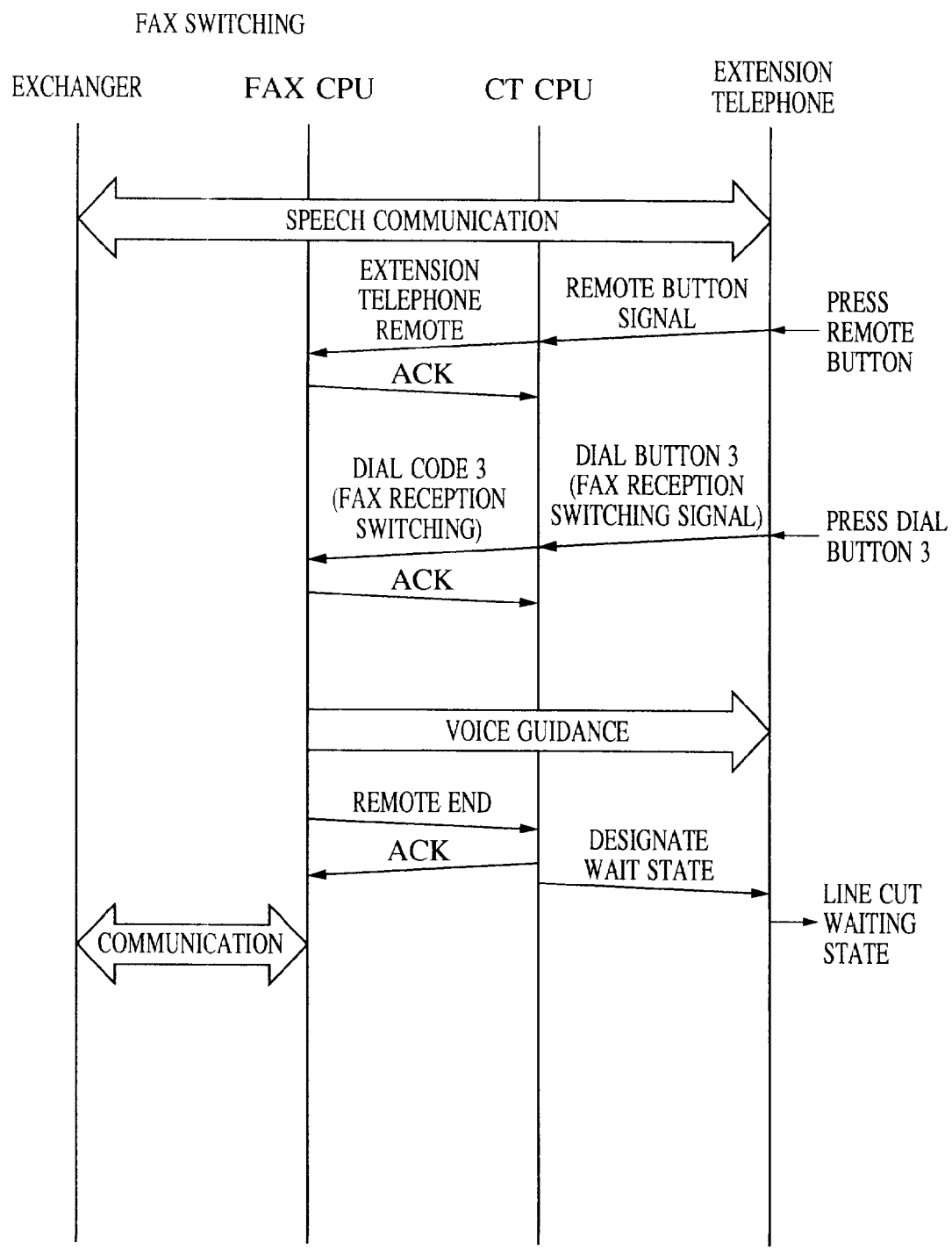
FIG. 30 is a sequence chart showing facsimile communication switching by remote control of an extension telephone of the facsimile device according to the embodiment of the present invention.
Figure 31:
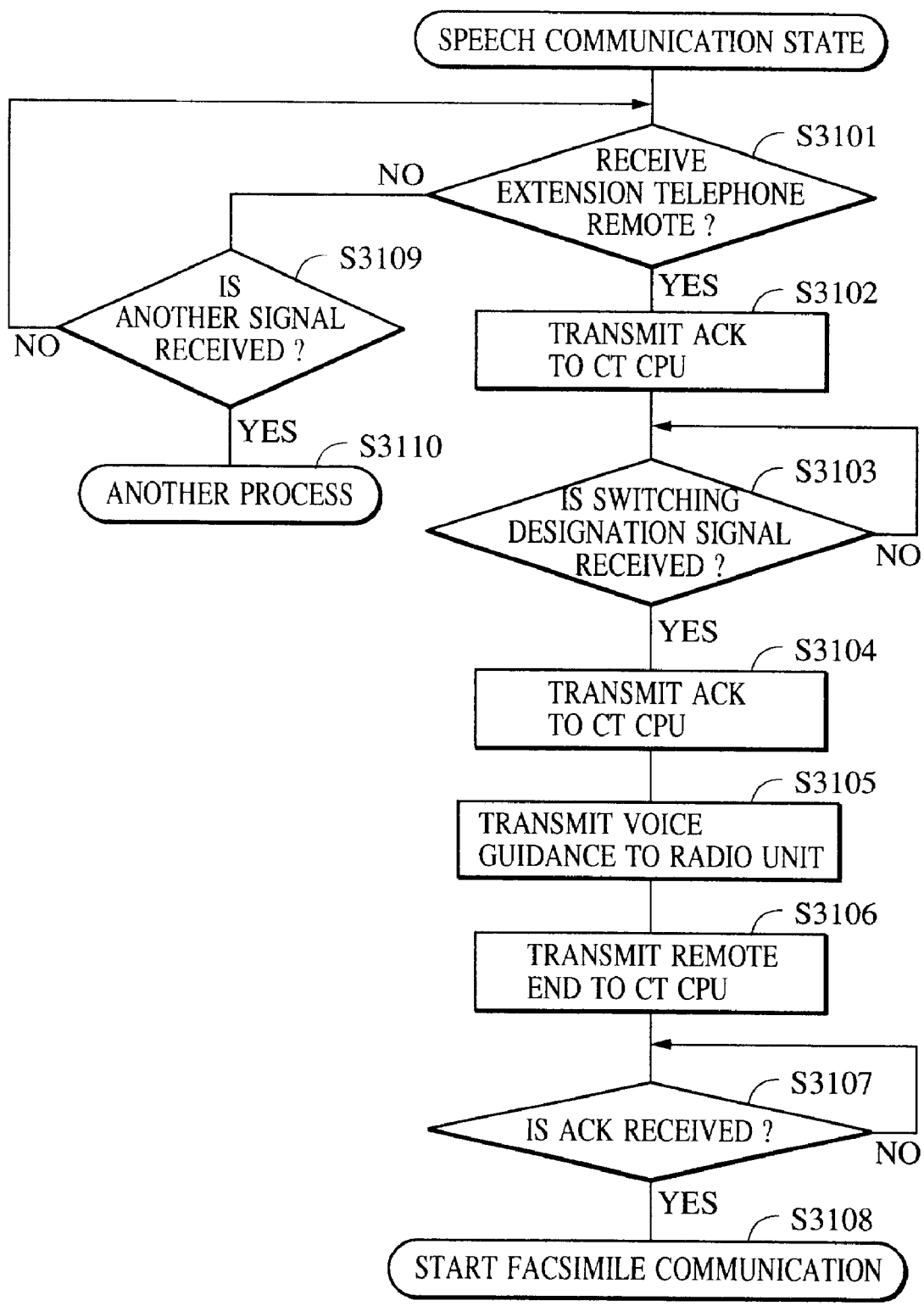
FIG. 31 is a flow chart showing an operation of a facsimile controller (FAC CPU) when facsimile communication is switched by remote control of an extension telephone of the facsimile device according to the embodiment of the present invention.
Figure 32:
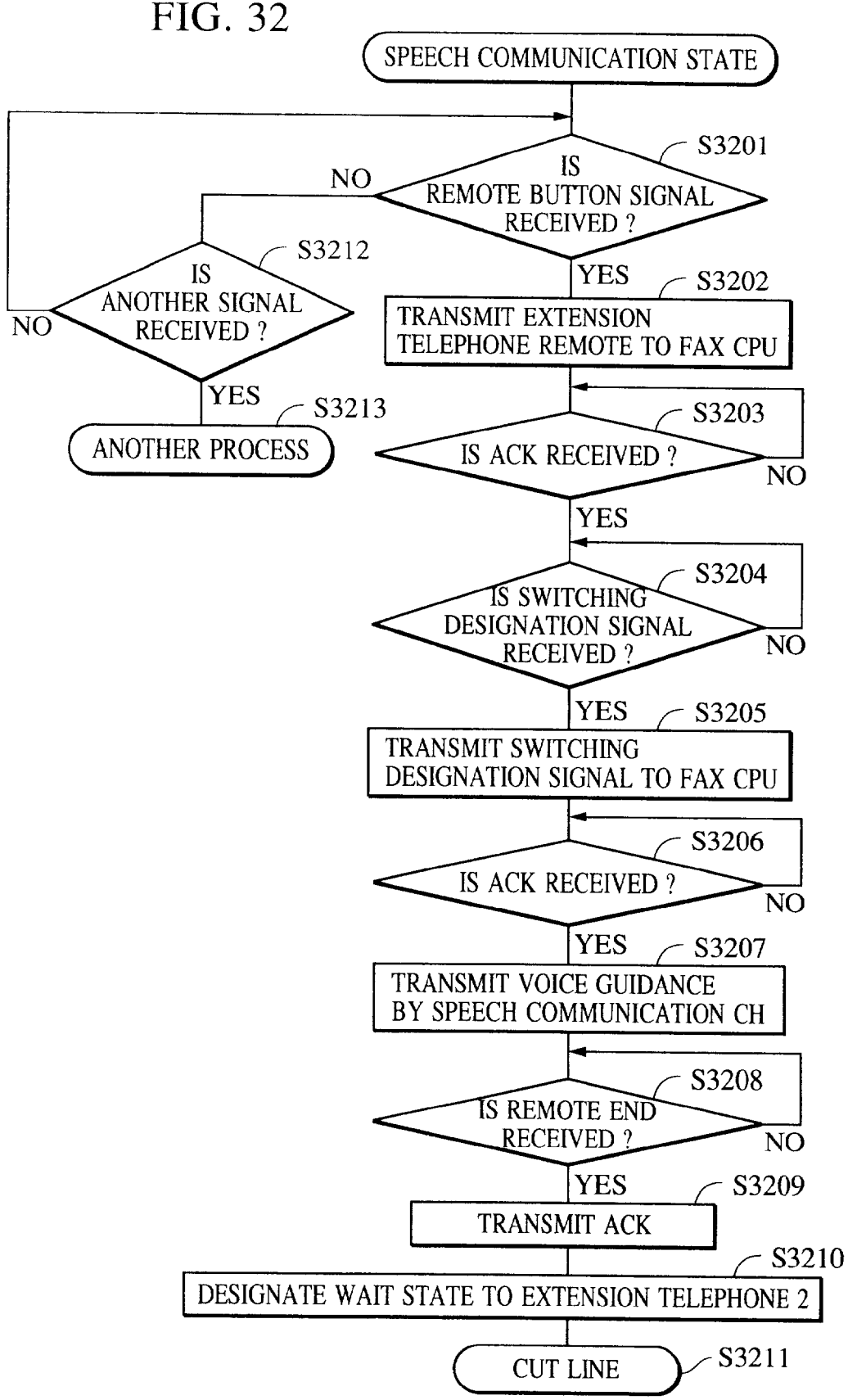
FIG. 32 is a flow chart showing an operation of a radio controller (CT CPU) of a radio unit when facsimile communication is switched by remote control of an extension telephone of the facsimile device according to the embodiment of the present invention.

FIG. 30 shows a sequence chart obtained when the state is switched to a facsimile communication state by remote control of the extension telephone 2 in a state wherein speech communication between the extension telephone 2 and a communication destination of the outside line is established. FIG. 31 is a flow chart showing an operation of the facsimile controller (FAX CPU) 121 of the facsimile device 1 in the sequence in FIG. 30, FIG. 32 is a flow chart showing an operation of the radio controller (CT CPU) 114 of the radio unit 11 of the facsimile device 1 in the sequence in FIG. 30, and FIG. 33 is a flow chart showing an operation of the controller 26 of the extension telephone 2 in the sequence in FIG. 30.

Figure 33:
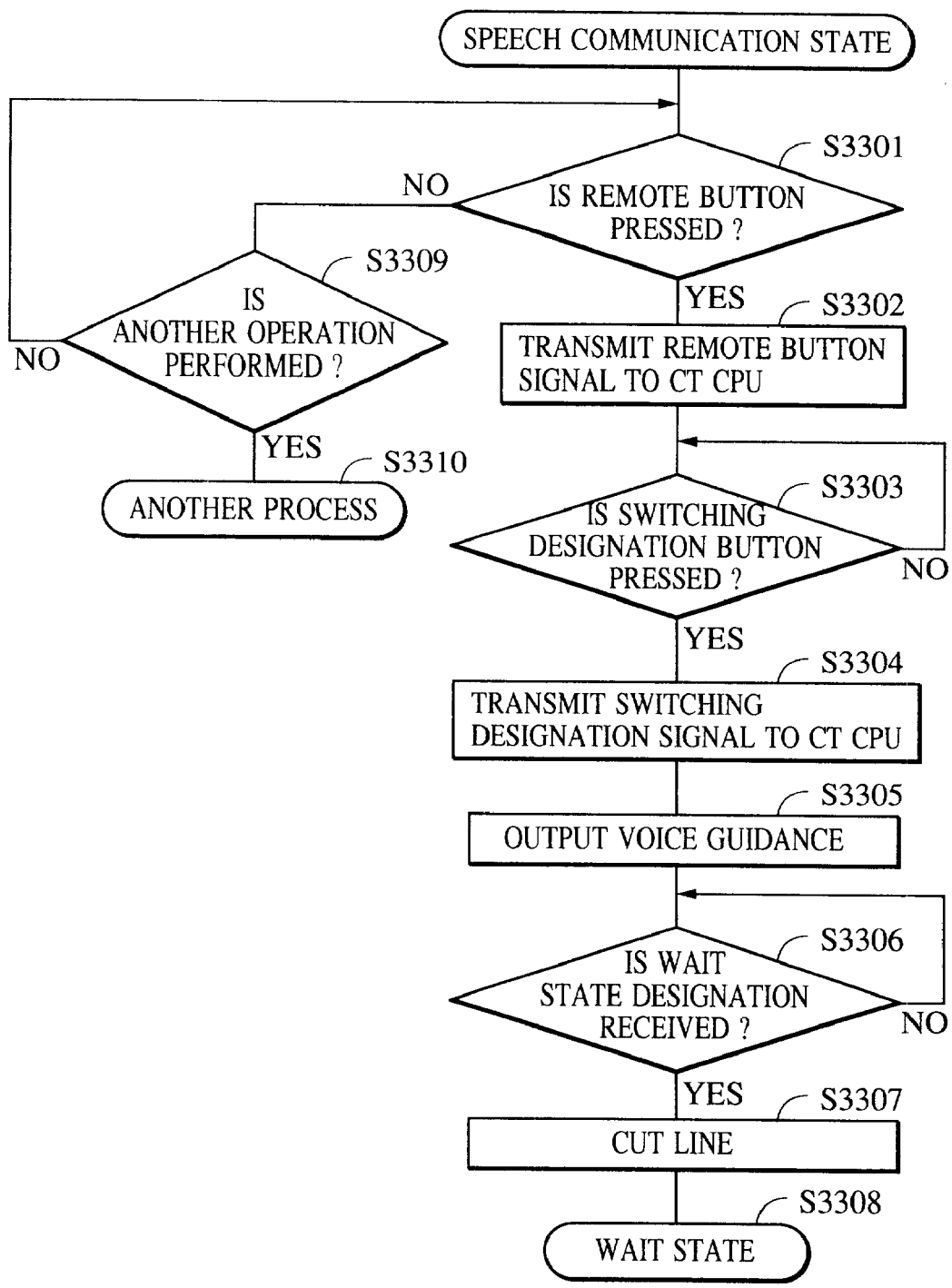
FIG. 33 is a flow chart showing an operation of a controller of an extension telephone when facsimile communication is switched by remote control of the extension telephone of the facsimile device according to the embodiment of the present invention.

Referring to FIG. 33, when a remote button for performing remote control is pressed by the key matrix 22 (S3301) when speech communication state between the extension telephone 2 and a speech communication destination of the outside line is established, a remote button signal is transmitted to the radio controller (CT CPU) 114 of the radio unit 11 of the facsimile device 1 (S3302). When the radio controller (CT CPU) 114 of the radio unit 11 of the facsimile device 1 receives the remote button signal (S3201 in FIG. 32), the radio controller (CT CPU) 114 transmits an extension telephone remote command to the facsimile controller (FAX CPU) 121 (S3201). When the facsimile controller (FAX CPU) 121 receives the extension telephone remote command (S3101 in FIG. 31), the facsimile controller (FAX CPU) 121 sends an ACK back to the radio controller (CT CPU) 114 of the radio unit 11 (S3102).

When a remote reception button for causing speech communication by the extension telephone 2 to shift to facsimile communication is pressed by the key matrix 22 (S3303), the controller 26 of the extension telephone 2 transmits a FAX reception switching signal to the radio controller (CT CPU) 114 of the radio unit 11 of the facsimile device 1 (S3304).

In FIG. 30, a dial button 3 is used as the FAX reception switching signal.

When the radio controller (CT CPU) 114 of the radio unit 11 of the facsimile device 1 receives the ACK from the facsimile controller (FAX CPU) 121 (S3203) and then receives the FAX reception switching signal (S3204), the radio controller (CT CPU) 114 transmits the FAX reception switching command, i.e., a dial code 3, to the facsimile controller (FAX CPU) 121 (S3205).

When the facsimile controller (FAX CPU) 121 receives the FAX reception switching command (dial code 3) (S3103), the facsimile controller (FAX CPU) 121 sends the ACK back to the radio controller (CT CPU) 114 of the radio unit 11 (S3104) and transmits a voice guidance stored in the audio storage unit 123 to the radio unit 11 (S3105). Therefore, the facsimile controller (FAX CPU) 121 transmits a remote end command to the radio controller (CT CPU) 114 of the radio unit 11 (S3106).

When the radio controller (CT CPU) 114 of the radio unit 11 receives the ACK from the facsimile controller (FAX CPU) 121 (S3206), the radio controller (CT CPU) 114 transmits the voice guidance (to be supplied later) to the extension telephone 2 on an audio line through the speech communication channel (S3207). When the radio controller (CT CPU) 114 receives the remote end command which is supplied subsequent to the voice guidance (S3208), the radio controller (CT CPU) 114 transmits the ACK to the facsimile controller (FAX CPU) 121 (S3209), designates the extension telephone 2 to shift to a wait state (S3201), and cuts a radio line connected to the extension telephone 2 (S3211).

The controller 26 of the extension telephone 2 outputs the received voice guidance by the audio control 24 (S3305). When the controller 26 receives a designation for shifting to a wait state from the radio controller (CT CPU) 114 of the radio unit 11 of the facsimile device 1 (S3306), a radio line to the facsimile device 1 is cut off (S3307), and the controller 26 shifts to the wait state (S3308).

The facsimile controller (FAX CPU) 121 which receives the ACK from the radio controller (CT CPU) 114 of the radio unit 11 (S3107) starts facsimile communication through the telephone line 3 (S3108).

When the facsimile controller (FAX CPU) 121 receives a signal other than an extension telephone remote signal in S3101 (S3109), the facsimile controller (FAX CPU) 121 performs another process based on the signal (S3110).

When the radio controller (CT CPU) 114 of the radio unit 11 of the facsimile device 1 receives a signal other than a remote signal in S3201 (S3212), the radio controller (CT CPU) 114 performs another process based on the signal (S3213).

When the controller 26 of the extension telephone 2 detects an operation other than a pressing operation of the remote button in S3301 (S3309), the controller 26 performs a process based on the operation (S3310).

Figure 34:
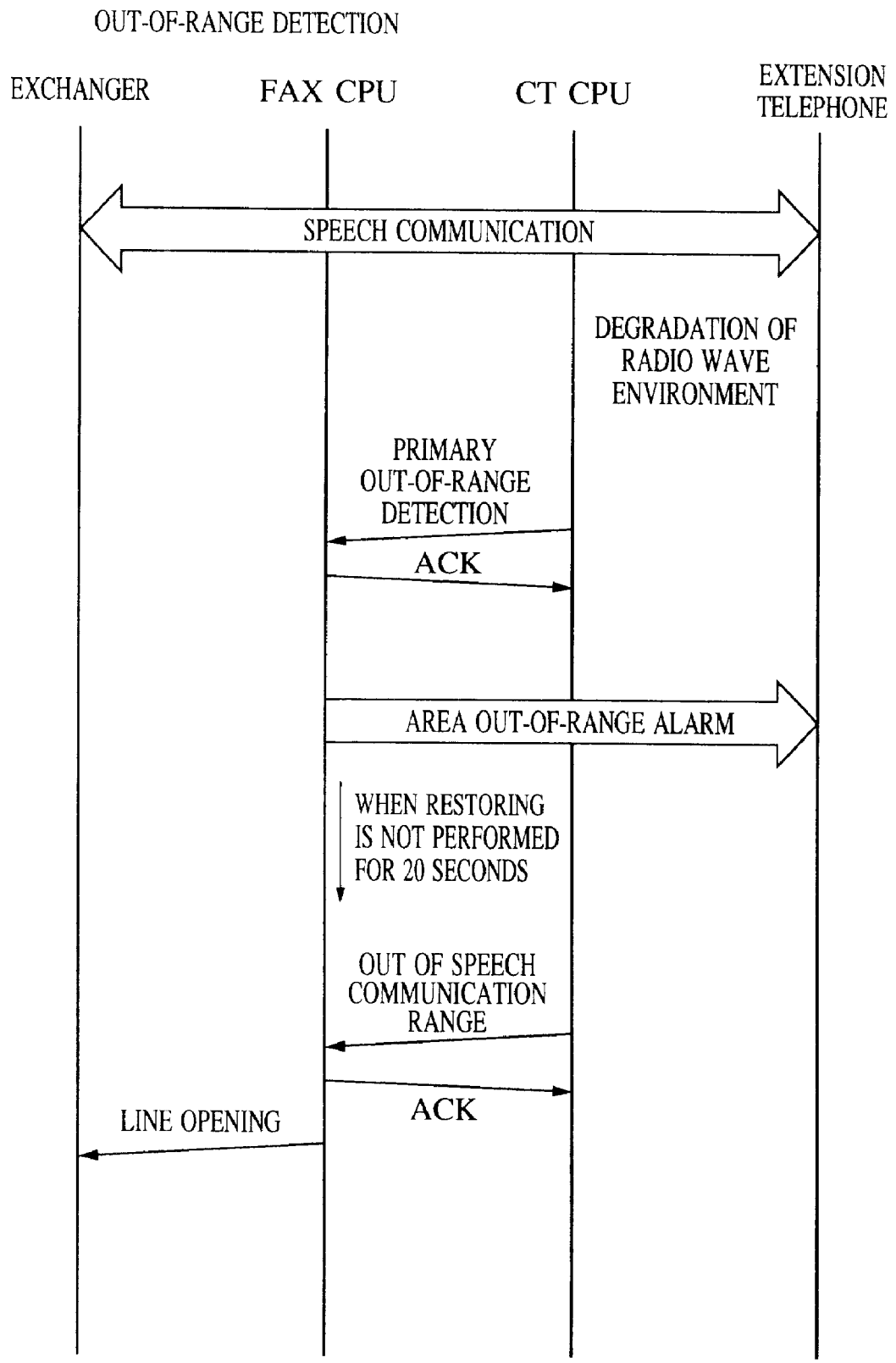
FIG. 34 is a sequence chart obtained when the radio controller (CT CRT) of the radio unit of the facsimile device according to the embodiment of the present invention detects an out-of-range state of an extension telephone.
Figure 35:
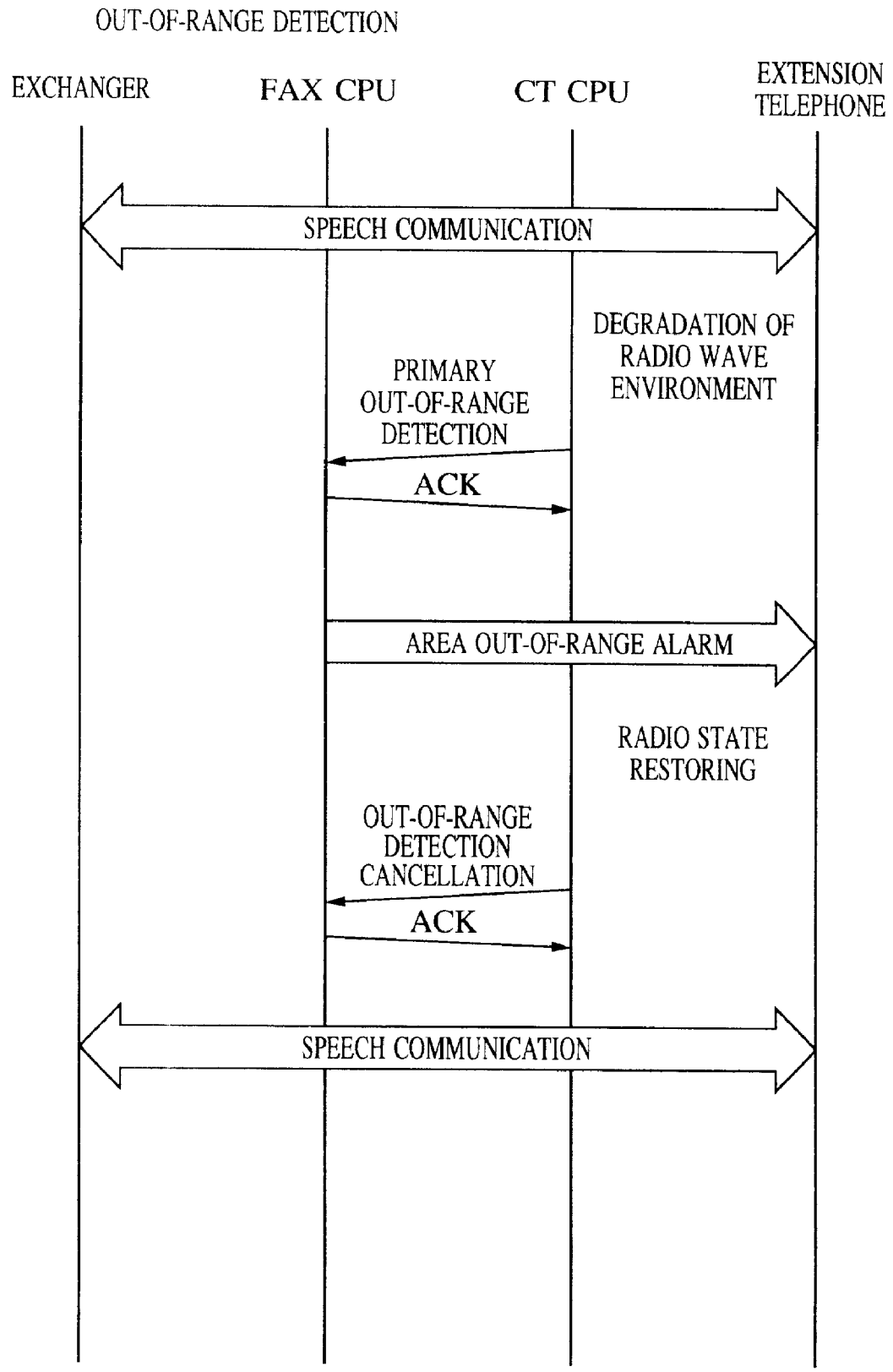
FIG. 35 is a sequence chart obtained when the radio controller (CT CRT) of the radio unit of the facsimile device according to the embodiment of the present invention detects an out-of-range state of an extension telephone.

FIG. 34 is a sequence chart obtained in a case wherein the radio controller (CT CPU) 114 of the radio unit 11 of the facsimile device 1 cannot receive a signal from the extension telephone 2, the extension telephone 2 is set out of a radio area, and the line is opened. FIG. 35 is a sequence chart obtained when speech communication is restarted.

Figure 36:
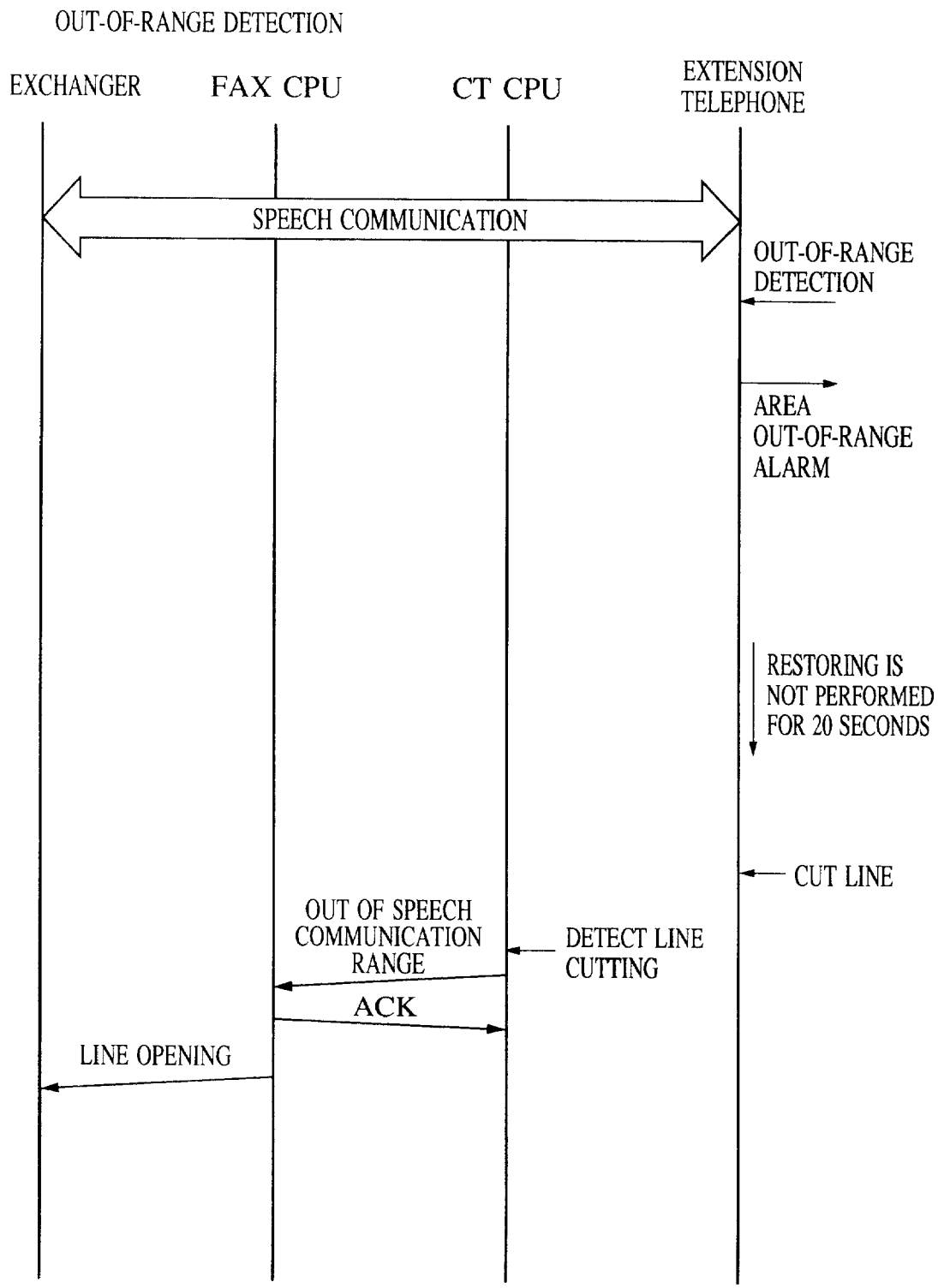
FIG. 36 is a sequence chart obtained when the controller of an extension telephone of the facsimile device according to the embodiment of the present invention detects an out-of-range state of the extension telephone.
Figure 37:
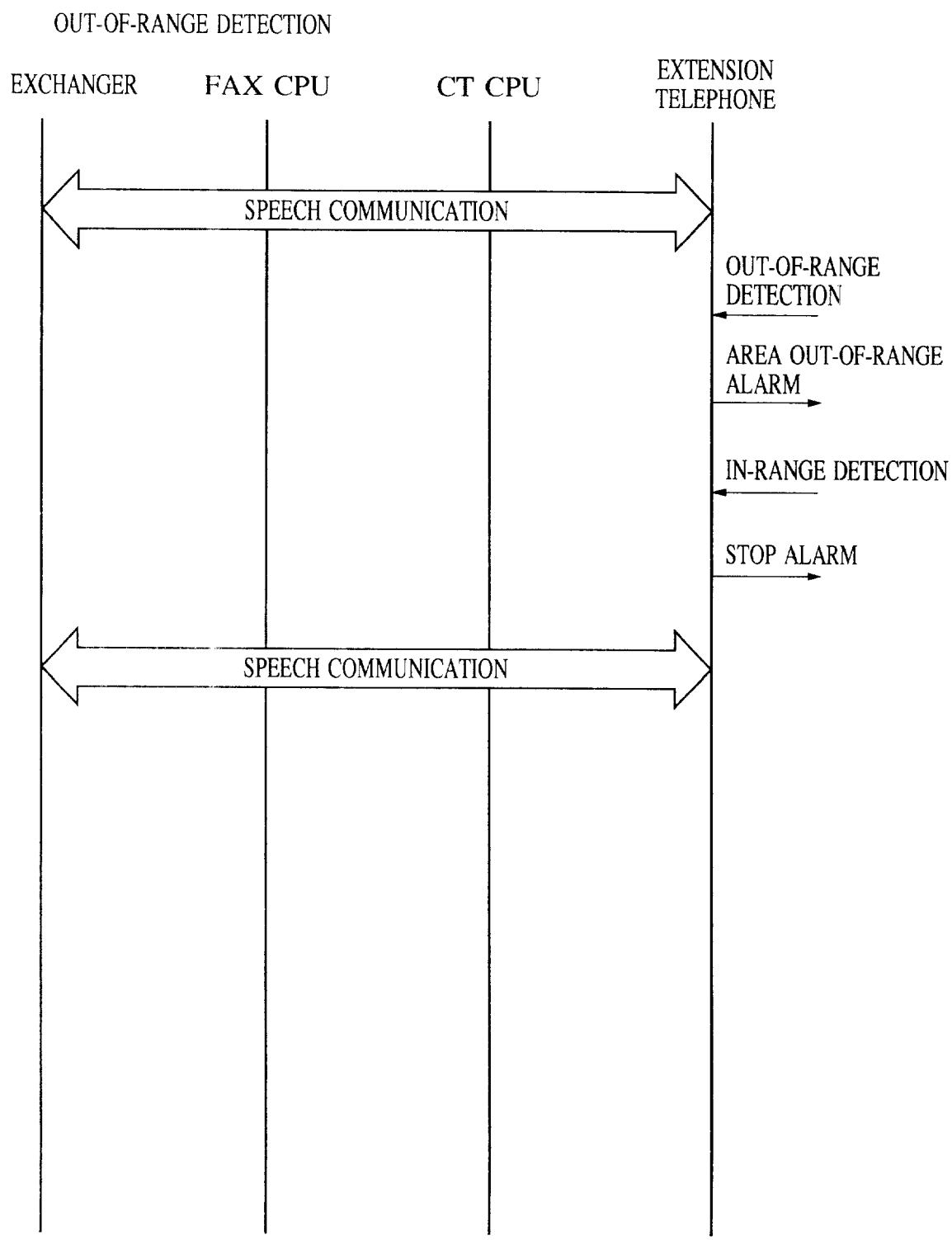
FIG. 37 is a sequence chart obtained when the controller of an extension telephone of the facsimile device according to the embodiment of the present invention detects an out-of-range state of the extension telephone.

FIG. 36 is a sequence chart obtained in a case wherein the controller 26 of the extension telephone 2 cannot receive a signal from the facsimile device 1, and the line is opened. FIG. 37 is a sequence chart obtained when speech communication is restarted.

Figure 38:
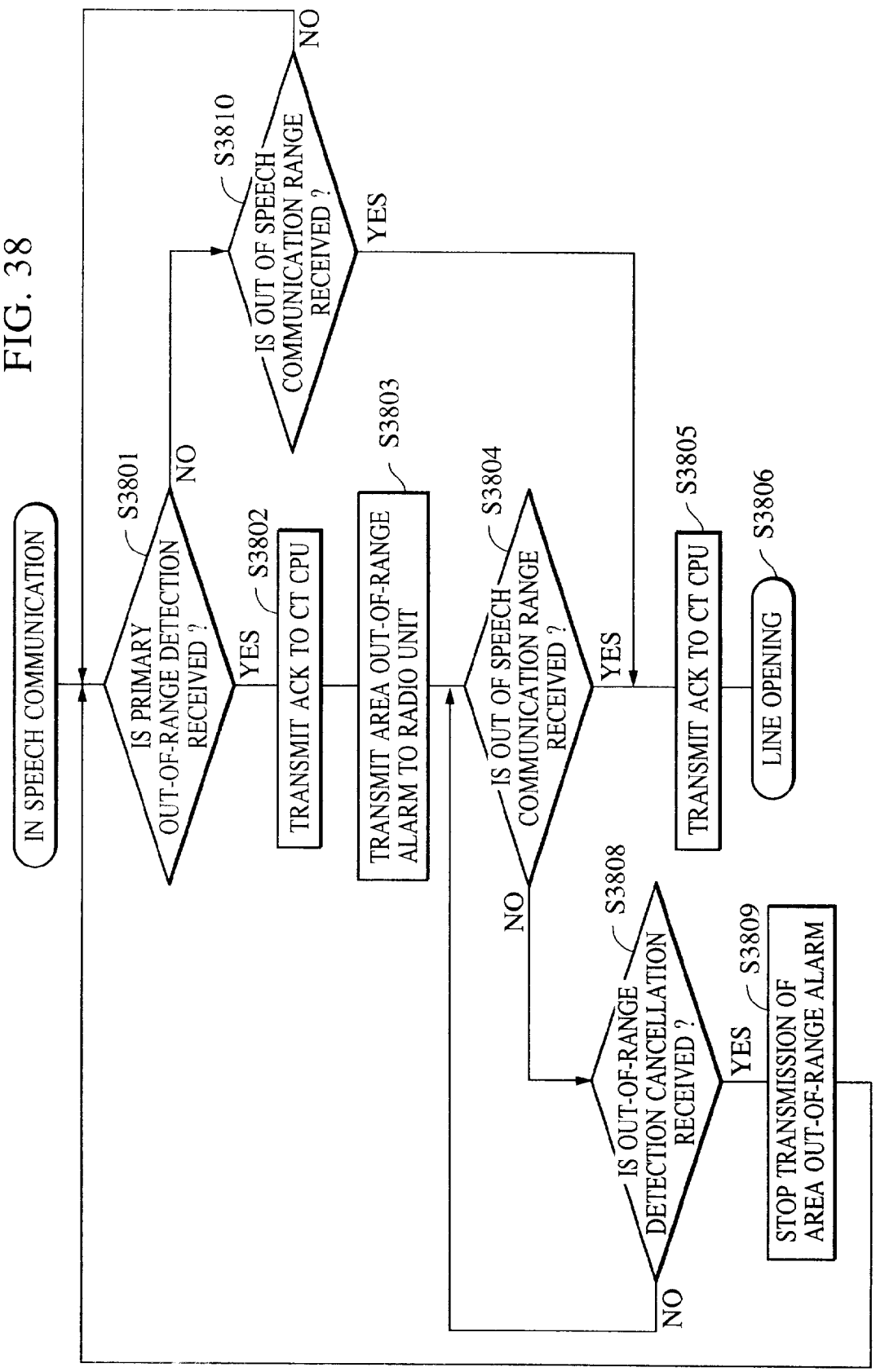
FIG. 38 is a flow chart showing an operation of the facsimile controller (FAX CPU) when an extension telephone of the facsimile device according to the embodiment of the present invention is in an out-of-range state.

FIG. 38 is a flow chart showing an operation of the facsimile controller (FAX CPU) 121 in the cases shown in FIGS. 34 to 37. FIG. 39 is a flow chart showing an operation of the radio controller (CT CPU) 114 of the radio unit 11 of the facsimile device 1. FIG. 40 is a flow chart showing an operation of the controller 26 of the extension telephone 2.

A case wherein the extension telephone 2 is set out of a radio area will be described below with reference to FIGS. 38 to 40.

Referring to FIG. 39, when it is determined that the radio controller (CT CPU) 114 of the radio unit 11 of the facsimile device 1 cannot receive a signal from the extension telephone 2 to set the extension telephone 2 out of a speech communication range because a radio wave environment is degraded or the distance between the extension telephone 2 and the facsimile device 1 becomes longer than the distance that a radio wave reaches (S3901), the radio controller (CT CPU) 114 of the radio unit 11 transmits a primary out-of-range detection command to the facsimile controller (FAX CPU) 121 (S3902). When the facsimile controller (FAX CPU) 121 receives this primary out-of-range detection command (S3801 in FIG. 38), the facsimile controller (FAX CPU) 121 transmits an ACK to the radio controller (CT CPU) 114 of the radio unit 11 (S3802), and transmits an out-of-range alarm tone for notifying the extension telephone 2 of an out-of-area state to the radio unit 11 (S3803). The radio controller (CT CPU) 114 of the radio unit 11 receives the ACK from the facsimile controller (FAX CPU) 121 (S3903), and then transmits an area out-of-range alarm tone transmitted to the facsimile controller (FAX CPU) through the speech communication channel to put the area out-of-range alarm tone on the audio line (S3904). When the extension telephone 2 receives the area out-of-range alarm tone, the area out-of-range alarm tone is output by using the audio control 24. Since the area out-of-range alarm tone is put on the audio line to be transmitted to the extension telephone 2 as described above, a signal from the extension telephone 2 does not reach the facsimile device 1. However, when a signal from the facsimile device 1 reaches the extension telephone 2, it is recognized that the operation of the extension telephone 2 is out of a speech communication range.

When the extension telephone 2 is continuously set out of the speech communication range for a predetermined period of time (20 seconds in this embodiment) (S3905), an out-of-range command to the facsimile controller (FAX CPU) 121 (S3906). When the facsimile controller (FAX CPU) 121 receives the out-of-range command (S3804), the facsimile controller (FAX CPU) 121 sends the ACK back to the radio controller (CT CPU) 114 (S3805), and a line to a communication destination (S3806). When the radio controller (CT CPU) 114 of the radio unit 11 receives the ACK from the facsimile controller (FAX CPU) 121 (S3907), a radio line to the extension telephone 2 is cut off (S3908), and the extension telephone 2 is set in a wait state (S3909).

When the radio controller (CT CPU) 114 of the radio unit 11 can receive the signal from the extension telephone 2 before 20 seconds has passed in S3905 in FIG. 39 to cause the extension telephone 2 to be out of the speech communication range (S3910), the radio controller (CT CPU) 114 transmits an out-of-range detection canceling command to the facsimile controller (FAX CPU) 121 (S3911). When the facsimile controller (FAX CPU) 121 receives the out-of-range detection canceling command from the radio controller (CT CPU) 114 of the radio unit 11 (S3808), transmission of the area out-of-range alarm tone is stopped (S3809), and the facsimile controller (FAX CPU) 121 returns to a speech communication state.

Referring to FIG. 40, when the controller 26 of the extension telephone 2 cannot receive a signal from the facsimile device 1 and determines that speech communication with the facsimile device 1 cannot be established (S4001), the area out-of-range alarm tone is made from the loudspeaker of the audio control 24 (S4002). The area out-of-range alarm tone may be made from the loudspeaker of a transmitter/receiver for performing speech communication, or may be made from a loudspeaker other than the loudspeaker of the transmitter/receiver.

When this state continues for a predetermined period of time (20 seconds in this embodiment), the controller 26 cuts a radio line to the facsimile device 1 (S4004), and a wait state is set (S4005). When the controller 26 can receive a signal from the facsimile device 1 within 20 seconds (S4006), the area out-of-range alarm tone is stopped (S4007), and the extension telephone 2 returns to the wait state. When the extension telephone 2 cuts radio line in S4004, the radio controller (CT CPU) 114 of the radio unit 11 of the facsimile device 1 detects that the radio line is cut (S3912), the radio controller (CT CPU) 114 transmits the out-of-range command to the facsimile controller (FAX CPU) 121 in S3906 to perform operations in S3908 and S3909. When the facsimile controller (FAX CPU) 121 does not receive the primary out-of-range command in S3801 in FIG. 38, but receives the out-of-range command (S3810), the facsimile controller (FAX CPU) 121 sends the ACK back to the radio controller (CT CPU) 114 of the radio unit 11 in S3805 to open the line to a communication destination.

In the above description, when the radio controller (CT CPU) 114 of the radio unit 11 detects that the extension telephone 2 is out of the area, the facsimile controller (FAX CPU) 121 transmits the area out-of-range alarm tone to the radio unit, and the radio controller (CT CPU) 114 puts the area out-of-range alarm tone on the audio line to transmit it to the extension telephone 2. However, when the radio controller (CT CPU) 114 detects that the extension telephone 2 is out of the range, the radio controller (CT CPU) 114 transmits a control signal for notification of the out-of-range state to the extension telephone 2. When the extension telephone 2 receives the control signal, the radio controller (CT CPU) 114 may perform a display for notification of the out-of-range state.

In this embodiment, as described above, a control signal transmitted/received between the radio controller (CT CPU) 114 of the radio unit 11 of the facsimile device 1 and the controller 26 of the extension telephone 2, a method of transmitting/receiving the control signal, and a radio communication scheme vary depending on the type of the facsimile device like a control signal transmitted/received by a facsimile device which establishes radio communication between an extension telephone and the facsimile device, a method of transmitting/receiving the control signal, and a radio communication scheme for the control signal. However, a control signal transmitted/received through the interface 113 between the facsimile controller (FAX CPU) 121 of the facsimile device 1 and the radio controller (CT CPU) 114 and a method of transmitting/receiving the control signal can be replaced with those of another type of radio unit regardless of the type of facsimile device or radio unit by transmitting/receiving the signals shown in FIGS. 2 to 5 in the same manner (a control signal and a communication method are shared).

As has been described above, according to the present invention, in a radio communication device for performing radio communication and a communication device having a radio unit for performing radio communication with the radio communication device, a control signal exchanged between the radio unit and a controller of the communication device and a method of transmitting/receiving the control signal are shared. For this reason, the radio unit of another communication device can be controlled by the controller of the above communication device. More specifically, even if radio units are not formed for the types of communication devices, respectively, a radio unit can be shared by the communication device and another communication device.

When a transmitter/receiver is used as a radio communication device, even if a switching operation from speech communication using the transmitter/receiver to communication of a communication device which does not use a transmitter/receiver is performed, harsh grating noise is not suddenly output from the transmitter/receiver.

Even if it cannot be awarded that a radio communication device cannot communicate with a communication device, information representing that communication cannot be performed is transmitted from the communication device to the radio communication device. For this reason, an alarm tone can be output.

What is claimed is:

1. A communication device connectable to a communication line, comprising:
   a radio unit adapted to perform radio communication with an external wireless communication device;
   a communication unit adapted to communicate through at least the communication line with a second communication device; and
   an interface circuit adapted to perform communication of a control signal, which is common to a control signal that is used by another type of radio unit, between said radio unit and said communication unit,
   wherein the control signal is communicated between said radio unit and said communication unit when the wireless communication device performs communication with the second communication device through the communication line, and
   wherein said radio unit transmits a signal to the wireless communication device upon communication of the control signal between said radio unit and said communication unit.

2. A communication device according to claim 1, wherein said radio unit controls radio communication depending on a type of the wireless communication device.

3. A communication device according to claim 1, wherein said communication unit controls a first communication using said radio unit and a second communication that does not use said radio unit.

4. A communication device according to claim 3, wherein said communication unit includes a switching function adapted to switch the first communication to the second communication, and
   when switching between the first and second communications is performed by the switching function, said radio unit transmits information for notifying that the communications are switched between each other to the wireless communication device.

5. A communication device according to claim 4, wherein the information is a voice message, and
   said radio unit performs a transmission such that the wireless communication device can output the voice message.

6. A communication device according to claim 4, wherein the information is a control signal.

7. A communication device according to claim 1, wherein, when said radio unit cannot communicate with the wireless communication device in a communication with the wireless communication device, said radio unit transmits information for notifying that communication cannot be performed to the wireless communication device.

8. A communication device according to claim 7, wherein the information is a voice message, and
   said radio unit performs a transmission such that the wireless communication device can output the voice message.

9. A communication device according to claim 7, wherein the information is a control signal.

10. A communication device connectable to a communication line, comprising:
    a radio unit adapted to perform radio communication with an external wireless communication device;
    a communication unit adapted to communicate through at least the communication line with a second communication device; and
    an interface circuit adapted to perform communication of a control signal, which is common to a control signal that is used by another type of radio unit, between said radio unit and said communication unit, wherein the control signal is communicated between said radio unit and said communication unit when a first communication using said radio unit and a second communication without said radio unit are switched with respect to each other, and wherein said radio unit transmits a signal to the wireless communication device upon communication of the control signal between said radio unit and said communication unit.

11. A communication device connectable to a communication line, comprising:

a radio unit adapted to perform radio communication with an external wireless communication device;

a communication unit adapted to communicate through at least the communication line with a second communication device; and an interface circuit adapted to perform communication of a control signal, which is common to a control signal that is used by another type of radio unit, between said radio unit and said communication unit, wherein the control signal is communicated between said radio unit and said communication unit in accordance with the radio wave environment between said radio unit and the wireless communication device.

* * * * *

UNITED STATES PATENT AND TRADEMARK OFFICE
CERTIFICATE OF CORRECTION

PATENT NO.     : 6,532,371 B2
DATED          : March 11, 2003
INVENTOR(S)    : Yosuki Ezumi It is certified that error appears in the above-identified patent and that said Letters Patent is hereby corrected as shown below:

Title page,
Item [56], References Cited, FOREIGN PATENT DOCUMENTS,
"4083454" should read -- 4-083454 --.
"4249466" should read -- 4-249466 --.
"4064887" should read -- 7-064887 --.

Drawings,
Sheet 3, Fig. 3, "SIMULTABEOUS CALLING" should read -- SIMULTANEOUS CALLING --.
Sheet 4, Fig. 4A, "OOPEN" should read -- OPEN --.
Sheet 4, Fig. 4A, "TPE" should read -- TYPE --.
Sheet 4, Fig. 4A, "ECTENSION" should read -- EXTENSION --.
Sheet 9, Fig. 7A, "HOKD CANCELLATION" should read -- HOLD CANCELLATION --.
Sheet 12, Fig. 9A, "OFF-FOOK" should read -- OFF-HOOK --.

Signed and Sealed this

Twenty-eighth Day of October, 2003

JAMES E. ROGAN
*Director of the United States Patent and Trademark Office*